US012634397B1

(12) United States Patent
Helwani et al.

(10) Patent No.: US 12,634,397 B1
(45) Date of Patent: May 19, 2026

(54) CLOCK SKEW ROBUST ACOUSTIC ECHO CANCELLATION

(71) Applicant: Amazon Technologies, Inc., Seattle, WA (US)

(72) Inventors: Karim Helwani, Mountain View, CA (US); Erfan Soltanmohammadi, Silver Spring, MD (US); Michael Mark Goodwin, Scotts Valley, CA (US); Arvindh Krishnaswamy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 665 days.

(21) Appl. No.: 18/061,738

(22) Filed: Dec. 5, 2022

(51) Int. Cl.
 *H04M 9/08* (2006.01)

(52) U.S. Cl.
 CPC ........... *H04M 9/082* (2013.01); *H04M 9/087* (2013.01)

(58) Field of Classification Search
 CPC .............................. H04M 9/082; H04M 9/087
 See application file for complete search history.

(56) References Cited

U.S. PATENT DOCUMENTS

| | | | | | |
|---|---|---|---|---|---|
| 4,677,668 | A * | 6/1987 | Ardalan | .................. | H04B 3/237 |
| | | | | | 379/406.05 |
| 8,879,438 | B2 * | 11/2014 | Saleem | .................. | H04M 9/082 |
| | | | | | 379/406.01 |
| 9,083,783 | B2 * | 7/2015 | Ikram | .................... | H04B 3/234 |

| | | | | | |
|---|---|---|---|---|---|
| 9,343,073 | B1 * | 5/2016 | Murgia | ................. | H04M 9/082 |
| 9,444,566 | B1 * | 9/2016 | Mustiere | ............... | H04J 3/0667 |
| 9,671,822 | B2 * | 6/2017 | Aweya | .................. | H04J 3/0667 |
| 9,916,840 | B1 * | 3/2018 | Do | ......................... | H04M 9/082 |
| 10,374,786 | B1 * | 8/2019 | Mustiere | ............... | H04J 3/0635 |
| 11,018,789 | B2 * | 5/2021 | Aweya | .................. | H04J 3/0644 |
| 11,509,411 | B2 * | 11/2022 | Vincent | .................... | G06F 1/12 |
| 11,875,810 | B1 * | 1/2024 | Helwani | ............... | G06N 3/045 |
| 2013/0044873 | A1 * | 2/2013 | Etter | ..................... | H04M 9/082 |
| | | | | | 704/226 |
| 2018/0145863 | A1 * | 5/2018 | Chaloupka | .......... | H04L 43/0852 |
| 2024/0048931 | A1 * | 2/2024 | Southwell | ............ | G10L 19/018 |

(Continued)

OTHER PUBLICATIONS

J. Benesty; "Adaptive Estimation of Clock Skew and Different Types of Delay in the Internet Network"; Adaptive Signal Processing; 2003; p. 341-351.

(Continued)

*Primary Examiner* — Lisa Hashem
(74) *Attorney, Agent, or Firm* — BakerHostetler

(57) ABSTRACT

Far-end audio samples may be received corresponding to far-end audio that is output from one or more audio output components. Near-end audio samples may be received corresponding to near-end audio that is captured by one or more audio input components. A plurality of acoustic path estimates and a plurality of clock skew estimates may be calculated in an alternating order, using a state-space model, based at least in part on the far-end audio samples and the near-end audio samples. A first acoustic path estimate and a first clock skew estimate may be used to calculate a second acoustic path estimate. A first portion of the far-end audio may be filtered with the second acoustic path estimate to generate a replica of echo in the first portion of the far-end audio. The replica of the echo may be removed from a corresponding second portion of the near-end audio.

20 Claims, 16 Drawing Sheets

(56)                    References Cited

U.S. PATENT DOCUMENTS

| | | | |
|---|---|---|---|
| 2024/0056757 A1* | 2/2024 | Southwell | G01S 15/88 |
| 2024/0204895 A1* | 6/2024 | Wang | H04L 67/12 |

OTHER PUBLICATIONS

Wang et al.; "Correlation Maximization-Based Sampling Rate Offset Estimation for Distributed Microphone Arrays"; IEEE/ACM Transactions on Audio, Speech, and Language Processing; vol. 24; Mar. 2016; p. 571-582.

Cherkassky et al.; "Blind Synchronization in Wireless Acoustic Sensor Networks"; IEEE/ACM Transactions on Audio, Speech, and Language Processing; vol. 25 No. 3; Mar. 2017; p. 651-661.

Thune et al.; "Tracking Theory of Adaptive Filters with Input-Output Sampling Rate Offset"; 27$^{th}$ European Signal Processing Conf.; 2019; 5 pages.

C. Avendano; "Acoustic echo suppression in the STFT domain"; IEEE Workshop on the Acoustics of Signal Processing to Audio and Acoustics; Oct. 2001; p. 175-178.

Helwani et al.; "A Single-Channel MVDR Filter for Acoustic Echo Suppression"; IEEE Signal Processing Letters; vol. 20; Apr. 2013; p. 351-354.

Valin et al.; "Low-Complexity, Real-Time Joint Neural Echo Control and Speech Enhancement Based On Percepnet"; IEEE Int'l Conf. on Acoustics, Speech and Signal Processing; 2021; p. 7133-7137.

Fa-Long Lou; Mobile Multimedia Broadcasting Standards; Springer; © 2009; 674 pages.

Mathew et al.; "Modified MP3 encoder using complex modified cosine transform"; Int'l Conf. on Multimedia and Expo; vol. 2; 2003; p. 709-712.

S. Waldron; An Introduction to Finite Tight Frames; Springer; © 2018; 567 pages.

Humphreys et al.; "Kalman Filtering with Newton's Method [Lecture Notes]"; IEEE Control Systems Magazine; vol. 30; Dec. 2010; p. 101-106.

Buchner et al.; "Blind Signal Processing for Time-varying Convolutive Mixing Systems Based on Sequence Estimation on Partly Smooth Manifolds"; IEEE Int'l Conf. on Acoustics, Speech and Signal Processing; 2019; p. 7913-7917.

S. Haykin; Adaptive Filter Theory; 4$^{th}$ edition; Prentice Hall; © 2002; 920 pages.

P. Huber; Robust Statistics; John Wiley & Sons; 2004; 308 pages.

Gansler et al.; "Double-talk robust fast converging algorithms for network echo cancellation"; IEEE Workshop on Applications of Signal Processing to Audio and Acoustics; Oct. 1999; p. 215-218.

Buchner et al.; "Robust extended multidelay filter and double-talk detector for acoustic echo cancellation"; IEEE Transactions on Audio, Speech and Language Processing; vol. 14; Sep. 2006; p. 1633-1644.

Jin et al.; "Algorithms for robust linear regression by exploiting the connection to sparse signal recovery"; IEEE Int'l Conf. on Acoustics, Speech and Signal Processing; 2010; p. 3830-3833.

P.862—Perceptual evaluation of speech quality (PESQ): An objective method for end-to-end speech quality assessment of narrowband telephone networks and speech codecs; Int'l Telecommunication Union; 2001; 30 pages.

Cutler et al.; "ICASSP 2022 Acoustic Echo Cancellation Challenge"; IEEE Int'l Conf. on Acoustics, Speech and Signal Processing; Feb. 2022; 5 pages.

Soo et al.; "Multidelay block frequency domain adaptive filter"; IEEE Transactions on Acoustics, Speech and Signal Processing; vol. 38 No. 2; Feb. 1990; p. 373-376.

Kuech et al.; "State-space architecture of the partitioned-block-based acoustic echo controller"; IEEE Int'l Conf. on Acoustics, Speech and Signal Processing; 2014; p. 1309-1313.

Dietzen et al.; "Partitioned block frequency domain Kalman filter for multi-channel linear prediction based blind speech dereverberation"; IEEE Int'l Workshop on Acoustic Signal Enhancement; 2016; 5 pages.

Kellermann et al.; "Acoustic echo cancellation in subbands"; The Journal of the Acoustical Society of America; vol. 87; 1990; p. S2.

Valin et al.; "On Adjusting the Learning Rate in Frequency Domain Echo Cancellation With Double-Talk"; IEEE Transactions on Audio, Speech and Language Processing; vol. 15; Mar. 2007; p. 1030-1034.

Ochiai et al.; "Echo Canceler with Two Echo Path Models"; IEEE Transactions on Communications; vol. 25 No. 6; Jun. 1977; p. 589-595.

Tai et al.; "Audio Watermarking over the Air with Modulated Self-correlation"; IEEE Int'l Conf. on Acoustics, Speech and Signal Processing; 2019; p. 2452-2456.

Enzner et al.; "Frequency-domain adaptive Kalman filter for acoustic echo control in hands-free telephones"; Signal Processing; vol. 86; 2006; p. 1140-1156.

Buchner et al.; "Unsupervised Bayesian Estimation and Tracking of Time-Varying Convolutive Multichannel Systems"; 22th Int'l Conf. on Information Fusion; 2019; 8 pages.

"Wikipedia—Toeplitz matrix," webpage <https://en.wikipedia.org/wiki/Toeplitz_matrix#Discrete_convolution> saved on Oct. 18, 2022 by Internet Archive Wayback Machine, retrieved from Internet Archive Wayback Machine <https://web.archive.org/web/20221018133708/https://en.wikipedia.org/wiki/Toeplitz_matrix#Discrete_convolution> on Jun. 11, 2024; 6 pages.

* cited by examiner

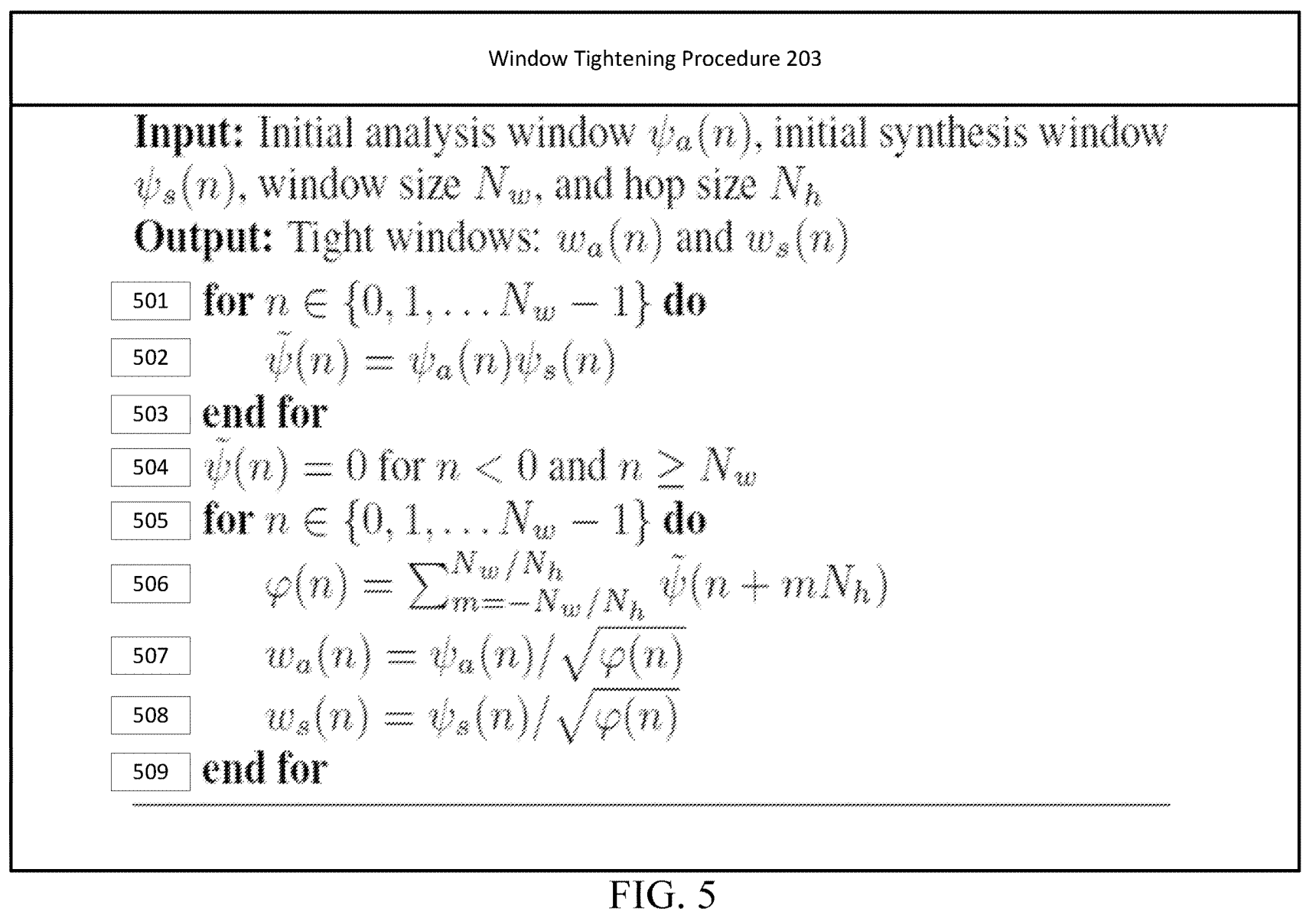

Window Tightening Procedure 203

Input: Initial analysis window $\psi_a(n)$, initial synthesis window $\psi_s(n)$, window size $N_w$, and hop size $N_h$

Output: Tight windows: $w_a(n)$ and $w_s(n)$

501   for $n \in \{0, 1, \ldots, N_w - 1\}$ do

502    $\tilde{\psi}(n) = \psi_a(n)\psi_s(n)$

503   end for

504   $\tilde{\psi}(n) = 0$ for $n < 0$ and $n \geq N_w$

505   for $n \in \{0, 1, \ldots, N_w - 1\}$ do

506    $\varphi(n) = \sum_{m=-N_w/N_h}^{N_w/N_h} \tilde{\psi}(n + mN_h)$

507    $w_a(n) = \psi_a(n)/\sqrt{\varphi(n)}$

508    $w_s(n) = \psi_s(n)/\sqrt{\varphi(n)}$

509   end for

FIG. 5

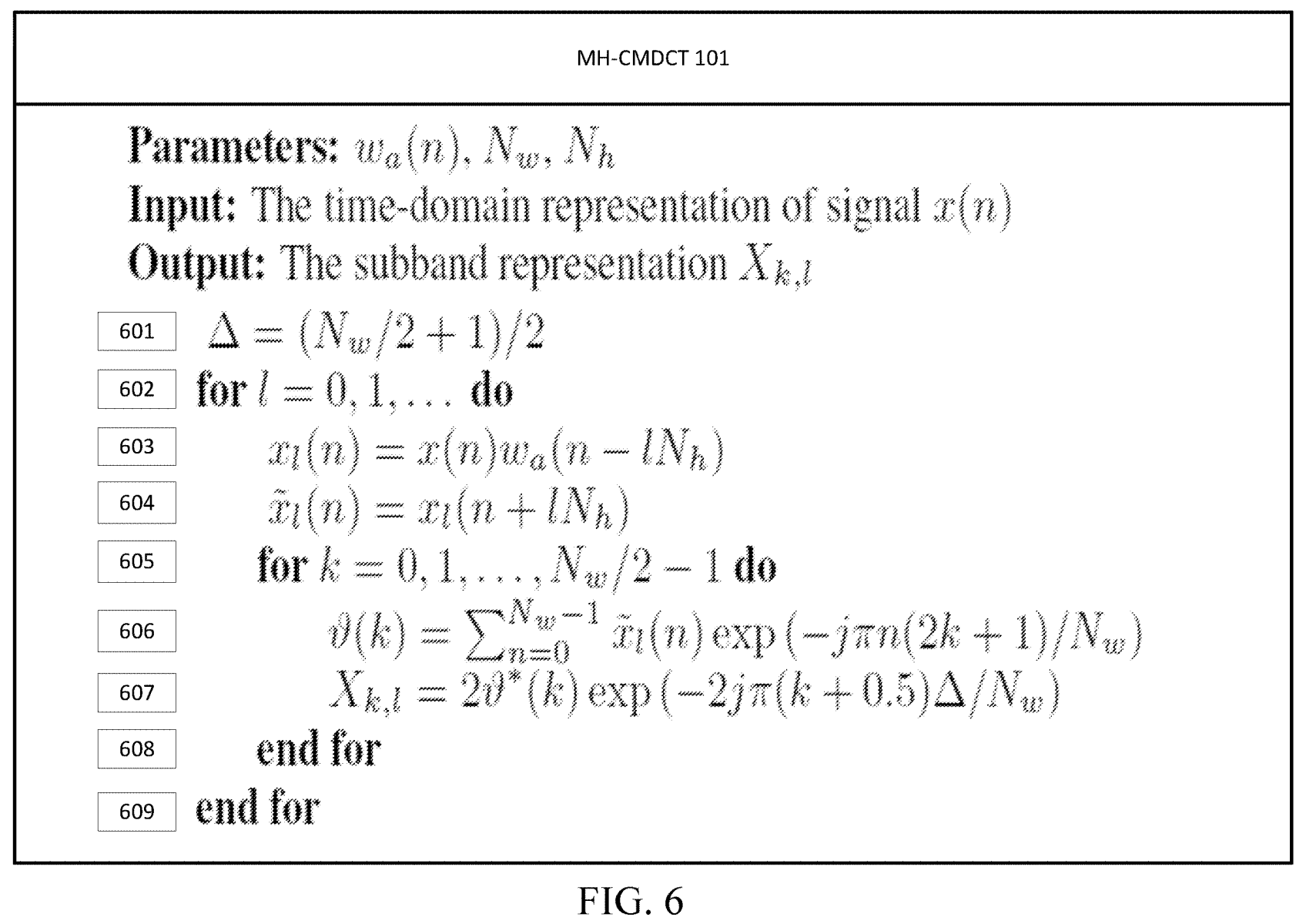

MH-CMDCT 101

Parameters: $w_a(n)$, $N_w$, $N_h$

Input: The time-domain representation of signal $x(n)$

Output: The subband representation $X_{k,l}$

601   $\Delta = (N_w/2 + 1)/2$

602   for $l = 0, 1, \ldots,$ do

603    $x_l(n) = x(n)w_a(n - lN_h)$

604    $\tilde{x}_l(n) = x_l(n + lN_h)$

605    for $k = 0, 1, \ldots, N_w/2 - 1$ do

606     $\vartheta(k) = \sum_{n=0}^{N_w - 1} \tilde{x}_l(n) \exp\left(-j\pi n(2k + 1)/N_w\right)$ 607     $X_{k,l} = 2\vartheta^*(k) \exp\left(-2j\pi(k + 0.5)\Delta/N_w\right)$ 608    end for

609   end for

FIG. 6

Figure 7:
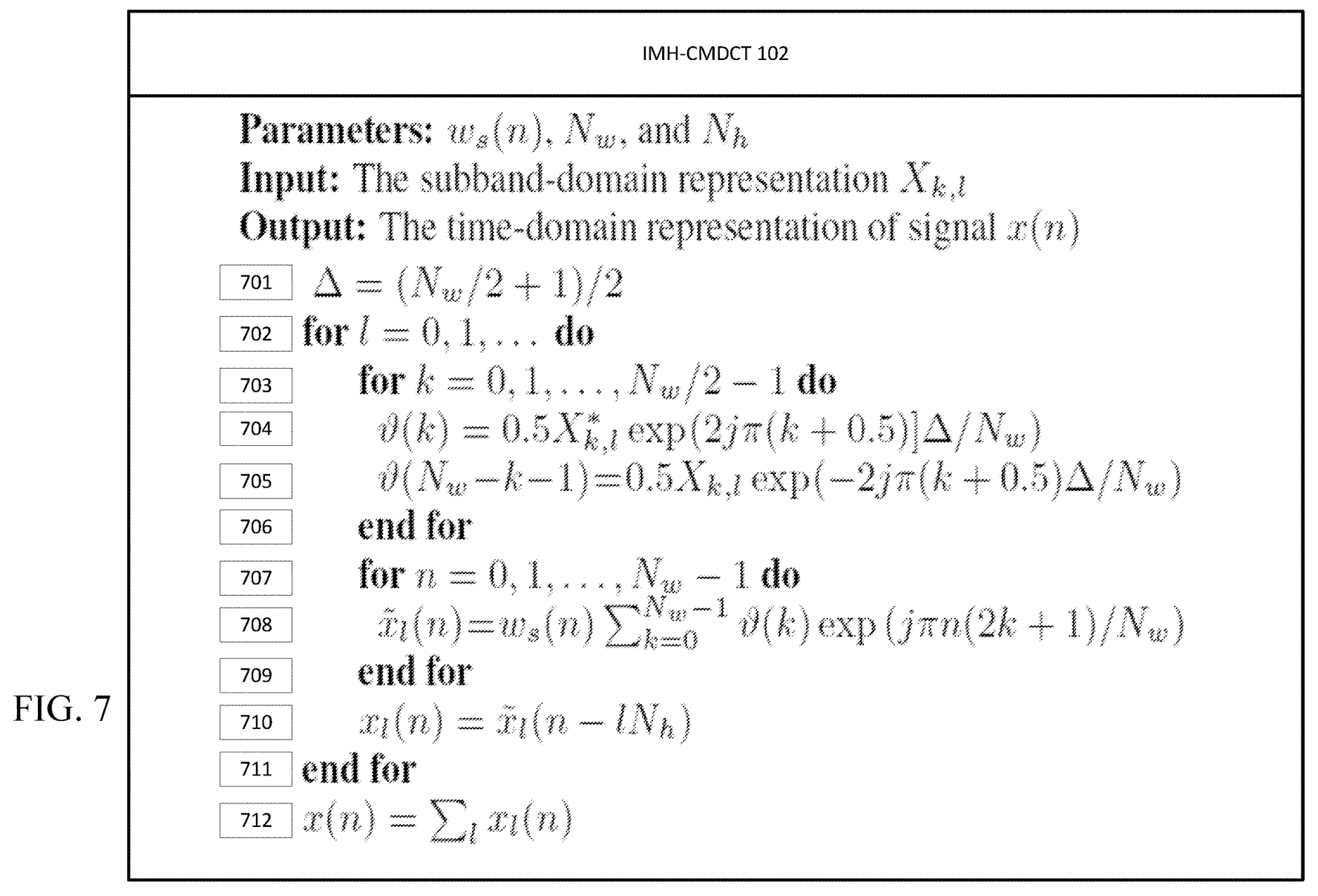

IMH-CMDCT 102

Parameters: $w_s(n)$, $N_w$, and $N_h$
Input: The subband-domain representation $X_{k,l}$
Output: The time-domain representation of signal $x(n)$ 701 $\quad \Delta = (N_w/2 + 1)/2$ 702 $\quad$ for $l = 0, 1, \ldots,$ do

703 $\quad\quad$ for $k = 0, 1, \ldots, N_w/2 - 1$ do

704 $\quad\quad\quad \vartheta(k) = 0.5 X^*_{k,l} \exp(2j\pi(k + 0.5)]\Delta/N_w)$ 705 $\quad\quad\quad \vartheta(N_w - k - 1) = 0.5 X_{k,l} \exp(-2j\pi(k + 0.5)\Delta/N_w)$ 706 $\quad\quad$ end for

707 $\quad\quad$ for $n = 0, 1, \ldots, N_w - 1$ do

708 $\quad\quad\quad \tilde{x}_l(n) = w_s(n) \sum_{k=0}^{N_w-1} \vartheta(k) \exp(j\pi n(2k+1)/N_w)$ 709 $\quad\quad$ end for

710 $\quad\quad x_l(n) = \tilde{x}_l(n - lN_h)$

711 $\quad$ end for

712 $\quad x(n) = \sum_l x_l(n)$

$$h_{k,l+1} = \theta(h_{k,l}, u_{k,l}) + \nu_{k,l},$$

802

Covariance of processing noise $$\Gamma^2_{\triangle,k,l} := \mathcal{E}\{\nu_{k,l}\nu_{k,l}^H\}$$

$$\mathcal{E}\{\cdot\} \text{ is the expectation}$$

$$\{\cdot\}^H \text{ denotes Hermetian transpose}$$

803

$$h_{k,l+1} = A_k h_{k,l} + \nu_{k,l},$$

804

$$d_{k,l} = h_{k,l}^H x_{k,l} + \varepsilon_{k,l},$$

805

Covariance of measurement noise $$\xi^2 := \mathcal{E}\{\varepsilon\varepsilon^*\}$$

$$\{\cdot\}^* \text{ is a conjugate operator}$$

FIG. 8

901A
$$g(a_k) = \hat{\mathcal{E}}\left\{ \|\check{h}_{k,l+1} - \check{h}_{k,l}a_k\|^2_{\Gamma^2_\Delta} \right\}$$

901B where $\|\cdot\|_C$ is the $\ell_2$-weighted norm with covariance matrix $C$, $a_k$ is a first column vector of $A_k$ assuming the state transition is a convolution operation, and $\check{h}$ is a Toeplitz matrix which corresponds to the convolution with $h$.

901C

The Toeplitz constraint can be obtained by enforcing a diagonal structure on the estimated convolution matrix in the Fourier domain. At every adaptation step, $\hat{A}_k$ is a full matrix from which only the diagonal elements are selected.

$$A = \mathrm{diag}\left(\left[1, \phi^1, ..., \phi^{N_w-1}\right]\right)$$

902

$$\text{where } \phi = \exp\left(j\frac{2\pi l\delta N_h}{N_w f_p}\right)$$

$$g = \hat{\mathcal{E}}\left\{\|D_{k,l+1} - h_{k,l+1}^{H}x_{k,l+1}\|_{\xi^2}^{2} + \lambda\|h_{k,l+1} - A_k h_{k,l}\|_{\Gamma_\Delta^2}^{2}\right\}$$

1002

$$\sigma_l^2 = \left[\left(\Gamma_{\Delta,l-1}^2 + A_{l-1}\sigma_{l-1}^2 A_{l-1}^H\right)^{-1} + \xi_\zeta^{-2}x_l x_l^H\right]^{-1}$$

$$\hat{h}_l = A_{l-1}\hat{h}_{l-1} + \xi_\zeta^{-2}\sigma_l^2 x_l \times \left[\left(\left(A_{l-1}\hat{h}_{l-1}\right)^H x_l - D_l\right)\right]$$

where $\sigma_l^2$ denotes the inverse of the Hessian

1003

$$\eta_{e,l}^2 = \xi_l^2 + x_l^H \sigma_{l-1}^2 x_l,$$

$$k_l = \eta_{e,l}^{-2} A_l \sigma_{l-1}^2 x_l,$$

$$E_l = D_l - \hat{h}_l^H x_l,$$

$$\hat{h}_{l+1} = A_l \hat{h}_l + k_l E_l^*,$$

$$\sigma_l^2 = A_l \sigma_{l-1}^2 A_l^H + \Gamma_{\Delta,l}^2 - \eta_{e,l}^2 k_l k_l^H$$

$$\begin{bmatrix} \xi_l & x_l^H \mho_{l-1} & 0 \\ 0 & A_l \mho_{l-1} & \Gamma_{\Delta,l} \end{bmatrix} Q_l = \begin{bmatrix} \eta_{e,l} & 0 & 0 \\ \bar{k}_l & \mho_l & 0 \end{bmatrix}$$

$$\text{where } \bar{k}_l = \eta_{e,l}^2 k_l$$

1102A $$g(\Upsilon_k, r_k) = \hat{\mathcal{E}} \left\{ \| D_{k,l+1} - x_{k,l}^H h_{k,l} - R_{k,l+1} \|_{\xi^2}^2 \right.$$

$$\left. + \lambda \| h_{k,l+1} - A h_{k,l} \|_{\Gamma_\Delta^2}^2 + \lambda_1 \| R_{k,l+1} \|_p^p \right\}$$

where the distribution $P(R_{k,l})$ is super-Gaussian.

$$R_{k,l} = (|e_{k,l}| - \Xi(e_{k,l})) \exp(j\angle(e_{k,l})),$$

where $\angle(\cdot)$ denotes the angle of a complex number, and

1102B $$\Xi_{k,l}(e_{k,l}) = \min \left\{ \frac{|e_{k,l}|}{\iota_{k,l-1}}, \kappa_0 \right\},$$

1103

$$\iota_{k,l} = \alpha_i \iota_{k,l-1} + \frac{(1-\alpha_i)}{\beta} \Xi(e_{k,l}) \iota_{k,l}$$

FIG. 11

Kalman Filtering Technique 1200

Input: Loudspeaker signal $X_{k,l}$, microphone signal $D_{k,l}$, $\forall k, l$

Output: The subband estimate of the near-end $e_l$

1201
$$h_{k,-1} = 0, \ \xi_{k,-1} = 0, \ \mho_{k,0} = J, \ \forall k, \ 1 < \kappa, \ 0 < \beta \leq 1,$$
$$0 < \alpha_i < 1, 0 < \alpha < 1 \quad \triangleright J \text{ is anti-diagonal identity matrix}$$

1202   for $l = 0, 1, \ldots$ do

1203     for $k \in \{0, 1, \ldots K - 1\}$ do

1204      $x_{k,l} = [X_{k,l-M+1}, \ldots, X_{k,l}]^T \quad \triangleright \{\cdot\}^T$ denotes a transpose operation.

1205      $E_{k,l} = d_{k,l} - h_{k,l-1}^H x_{k,l}$

1206      $\xi_{k,l}^2 = \alpha \xi_{k,l-1}^2 + (1 - \alpha)|E_{k,l}|^2$

1207     
$$\begin{bmatrix} \xi_{k,l} & x_{k,l}^H \mho_{k,l-1} & 0 \\ 0 & A_{k,l}\mho_{k,l-1} & \Gamma_{\Delta,k,l} \end{bmatrix} Q_{k,l} = \begin{bmatrix} \eta_{e,k,l} & 0 & 0 \\ \bar{\bar{k}}_{k,l} & \mho_{k,l} & 0 \end{bmatrix}$$

1208      $q_{k,l} = \frac{1}{\eta_{k,l}^2 + \epsilon} \bar{\bar{k}}_{k,l}$

1209      if $|E_{k,l}| < \kappa \iota_{k,l}$ then

1210       $\zeta_{k,l} = E_{k,l} - \left(|E_{k,l}| - \frac{|E_{k,l}|}{\iota_{k,l} + \epsilon}\right) \angle(E_{k,l})$ 1211      else $\zeta_{k,l} = E_{k,l} - (|E_{k,l}| - \kappa_0)\angle(E_{k,l})$ 1212      end if

1213      $\iota_{k,l} = \alpha_i \iota_{k,l-1} + (1 - \alpha_i)|\zeta_{k,l}| / \beta$ 1214      $h_{k,l} = h_{k,l-1} + q_{k,l}\zeta_{k,l}^*$ 1215     end for

1216     $e_l = [E_{0,l}, \ldots, E_{K-1,l}]^T$

1217   end for

FIG. 12

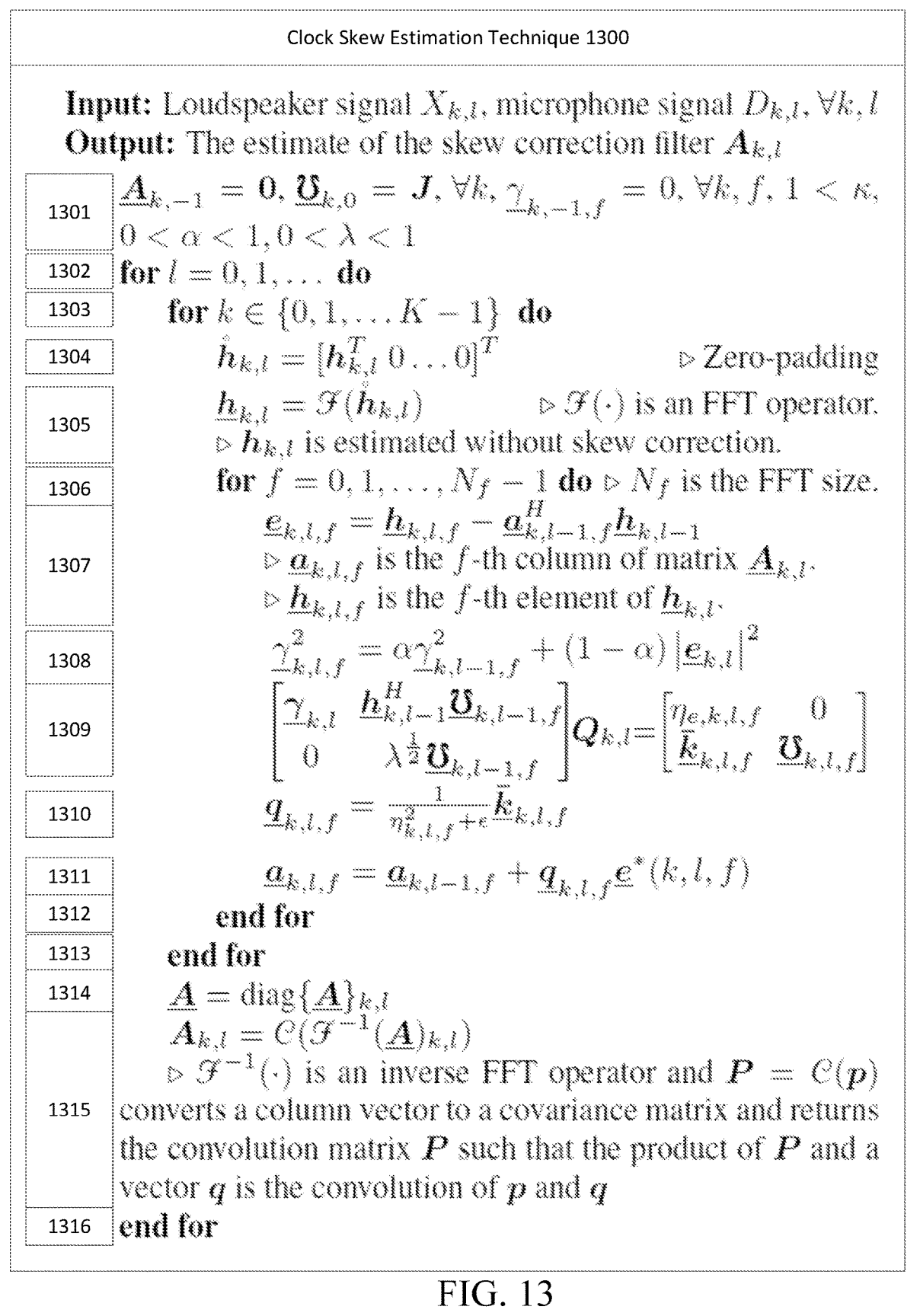

Clock Skew Estimation Technique 1300

Input: Loudspeaker signal $X_{k,l}$, microphone signal $D_{k,l}$, $\forall k, l$
Output: The estimate of the skew correction filter $A_{k,l}$ 1301   $\underline{A}_{k,-1} = 0, \underline{\mho}_{k,0} = J, \forall k, \gamma_{k,-1,f} = 0, \forall k, f, 1 < \kappa,$
$0 < \alpha < 1, 0 < \lambda < 1$ 1302   for $l = 0, 1, \ldots$ do

1303     for $k \in \{0, 1, \ldots K - 1\}$ do

1304       $\hat{h}_{k,l} = [h_{k,l}^T \, 0 \ldots 0]^T$      $\triangleright$ Zero-padding 1305       $\underline{h}_{k,l} = \mathcal{F}(\hat{h}_{k,l})$     $\triangleright \mathcal{F}(\cdot)$ is an FFT operator.
        $\triangleright h_{k,l}$ is estimated without skew correction.

1306       for $f = 0, 1, \ldots, N_f - 1$ do $\triangleright$ $N_f$ is the FFT size.

1307         $\underline{e}_{k,l,f} = \underline{h}_{k,l,f} - \underline{a}_{k,l-1,f}^H \underline{h}_{k,l-1}$
        $\triangleright \underline{a}_{k,l,f}$ is the $f$-th column of matrix $\underline{A}_{k,l}$.
        $\triangleright \underline{h}_{k,l,f}$ is the $f$-th element of $\underline{h}_{k,l}$.

1308         $\gamma_{k,l,f}^2 = \alpha \gamma_{k,l-1,f}^2 + (1 - \alpha)|\underline{e}_{k,l}|^2$ 1309         $\begin{bmatrix} \underline{\gamma}_{k,l} & \underline{h}_{k,l-1}^H \underline{\mho}_{k,l-1,f} \\ 0 & \lambda^{\frac{1}{2}} \underline{\mho}_{k,l-1,f} \end{bmatrix} Q_{k,l} = \begin{bmatrix} \eta_{e,k,l,f} & 0 \\ \underline{k}_{k,l,f} & \underline{\mho}_{k,l,f} \end{bmatrix}$ 1310         $\underline{q}_{k,l,f} = \frac{1}{\eta_{k,l,f}^2 + \epsilon} \tilde{\underline{k}}_{k,l,f}$ 1311         $\underline{a}_{k,l,f} = \underline{a}_{k,l-1,f} + \underline{q}_{k,l,f} \underline{e}^*(k,l,f)$ 1312       end for

1313     end for

1314     $\underline{A} = \text{diag}\{\underline{A}\}_{k,l}$

1315     $A_{k,l} = \mathcal{C}(\mathcal{F}^{-1}(\underline{A})_{k,l})$
    $\triangleright \mathcal{F}^{-1}(\cdot)$ is an inverse FFT operator and $P = \mathcal{C}(p)$
    converts a column vector to a covariance matrix and returns
    the convolution matrix $P$ such that the product of $P$ and a
    vector $q$ is the convolution of $p$ and $q$ 1316   end for

FIG. 13

Figure 14:
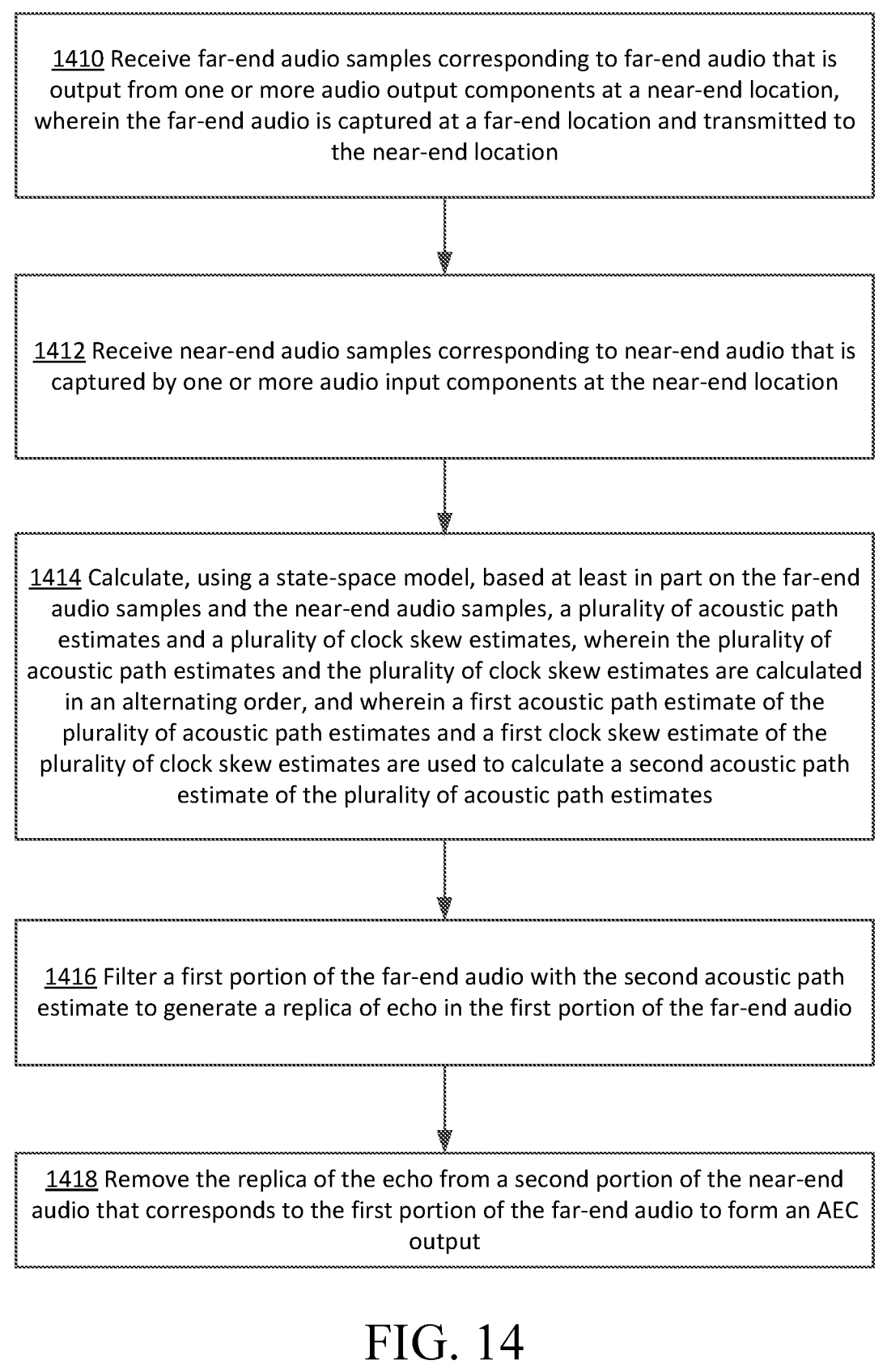

1410 Receive far-end audio samples corresponding to far-end audio that is output from one or more audio output components at a near-end location, wherein the far-end audio is captured at a far-end location and transmitted to the near-end location 1412 Receive near-end audio samples corresponding to near-end audio that is captured by one or more audio input components at the near-end location 1414 Calculate, using a state-space model, based at least in part on the far-end audio samples and the near-end audio samples, a plurality of acoustic path estimates and a plurality of clock skew estimates, wherein the plurality of acoustic path estimates and the plurality of clock skew estimates are calculated in an alternating order, and wherein a first acoustic path estimate of the plurality of acoustic path estimates and a first clock skew estimate of the plurality of clock skew estimates are used to calculate a second acoustic path estimate of the plurality of acoustic path estimates 1416 Filter a first portion of the far-end audio with the second acoustic path estimate to generate a replica of echo in the first portion of the far-end audio 1418 Remove the replica of the echo from a second portion of the near-end audio that corresponds to the first portion of the far-end audio to form an AEC output

CLOCK SKEW ROBUST ACOUSTIC ECHO CANCELLATION

BACKGROUND

In teleconferencing applications, there are disturbing echoes produced by the acoustic feedback of the loudspeaker signals into the microphones. Hence, a common technology for hands-free communication is acoustic echo cancellation (AEC), which aims at canceling the acoustic echoes from the microphone signals. In an AEC, the signal of the reproduction channel originates from speech or audio sources in a transmission room (far-end location). To cancel the echoes in the near-end location, an adaptation algorithm estimates a filter, which models the acoustic path from the loudspeaker to the microphone. The loudspeaker signal is then filtered to generate a replica of the echo in the microphone signal. The resulting signal is then subtracted from the near-end microphone signal. If the estimated filter coefficients are equal to the true transfer path, then all echoes will be removed. For the echo cancellation problem, an underlying assumption is that the loudspeaker and microphone signals are synchronized. Even a slight difference between clock (sampling) frequencies of the playback stream and the recording stream may cause a performance drop in AEC. In effect, the clock skew causes the channel seen from the microphone to expand or shrink over time.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating an example window tightening procedure that may be used in accordance with the present disclosure.

FIG. 6 is a diagram illustrating an example multi-hop complex modified discrete cosine transform (MH-CMDCT) that may be used in accordance with the present disclosure.

FIG. 7 is a diagram illustrating an example inverse multi-hop complex modified discrete cosine transform (IMH-CMDCT) that may be used in accordance with the present disclosure.

FIG. 8 is a diagram illustrating first example mathematical representations related to a state-space model for acoustic echo cancellation that may be used in accordance with the present disclosure.

FIG. 9 is a diagram illustrating second example mathematical representations related to a state-space model for acoustic echo cancellation that may be used in accordance with the present disclosure.

FIG. 10 is a diagram illustrating third example mathematical representations related to a state-space model for acoustic echo cancellation that may be used in accordance with the present disclosure.

FIG. 11 is a diagram illustrating fourth example mathematical representations related to a state-space model for acoustic echo cancellation that may be used in accordance with the present disclosure.

FIG. 12 is a diagram an example Kalman filtering technique that may be used in accordance with the present disclosure.

FIG. 13 is a diagram illustrating an example clock skew estimation technique that may be used in accordance with the present disclosure.

FIG. 14 is a flowchart illustrating an example clock skew robust AEC process that may be used in accordance with the present disclosure.

DETAILED DESCRIPTION

Figure 1:
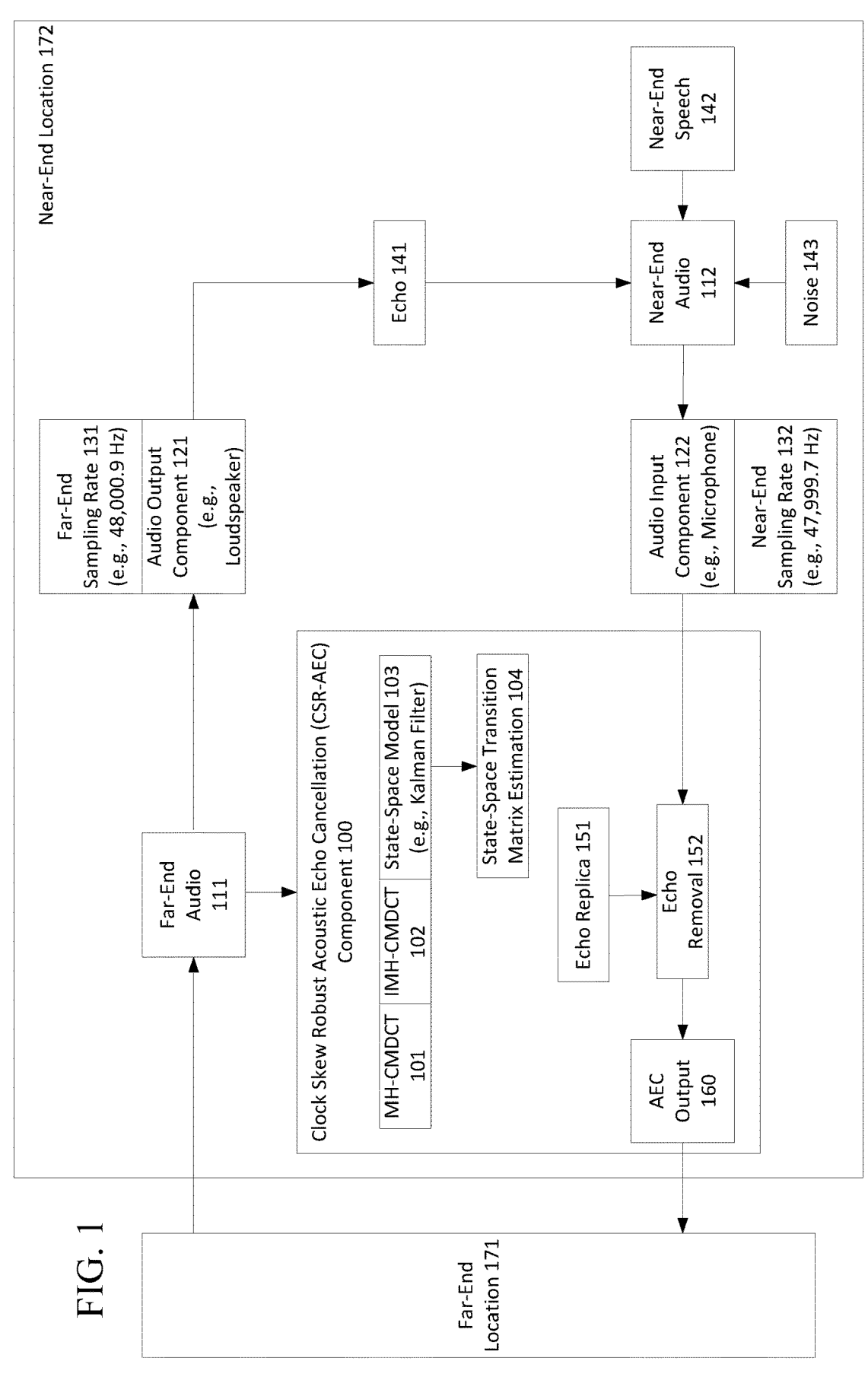
FIG. 1 is a diagram illustrating an example clock skew robust acoustic echo cancellation (AEC) system that may be used in accordance with the present disclosure.

Techniques for clock skew robust acoustic echo cancellation (AEC) are described herein. The techniques described herein are clock skew robust because they may assist in reducing the negative impacts on AEC caused by a difference in sampling frequencies between far-end and near-end audio. The techniques described herein may employ a state-space modelling (e.g., Kalman filtering) approach to acoustic echo cancellation that blindly accounts for the clock skew (caused by a difference in sampling frequencies) between an audio output component (e.g., loudspeaker) and an audio input component (e.g., microphone) without the need for exchanging timestamps when they have independent clocks. The state-space modelling (e.g., Kalman filtering) approach may be implemented in a sub-band domain based on a variation of the complex modified discrete cosine transform (CMDCT). In particular, the variation of the CMDCT may allow for a configurable hop size and, therefore, enhanced time resolution. The state-space modelling (e.g., Kalman filtering) approach described herein may be robust to both Gaussian and super-Gaussian near-end noises.

As described herein, a variation of the CMDCT may be employed to obtain sub-band domain representations of the far-end audio and the near-end audio based on their corresponding time domain representations. This variation of the CMDCT is referred to herein as the multi-hop complex modified discrete cosine transform (MH-CMDCT). The term multi-hop, as used herein, refers to a transform in which a configurable hop-size may be used. The term hop size, as used herein, refers to a window overlap size of successive windows of the far-end and near-end audio samples that are used to calculate the transform. The term configurable hop size means that a variety of different hop sizes may be used to perform the transform. For example, the traditional CMDCT transform has a fixed 50% hop size that limits the time resolution required for sub-band domain AEC or other sub-band processing. By contrast, the MH-CMDCT described herein does not require a 50% hop size and allows other hop sizes to be used. In some examples, prior to, or at the initiation of, performance of an AEC procedure, a desired hop size may be selected and then used for the MH-CMDCT transform. Once selected, the hop size may not change during the procedure. Additionally, the same hop size may be used for both the far-end audio and the near-end audio. Increasing the hop (overlap) size may increase the time resolution, thereby enabling changes in the far-end and near-end audio to be tracked more closely. For example, an MH-CMDCT transform with a hop size of more than 50% may allow changes to be tracked more closely than a CMDCT transform that is limited to 50% hop size.

In some examples, the MH-CMDCT may be applied to time domain representations of the far-end and near-end audio to obtain sub-band representations of the far-end and near-end audio. As described herein, the sub-band representations of the far-end and near-end audio may then be used to estimate the acoustic path, the clock skew and to process and filter the audio signals. Additionally, according to the described techniques, an inverse multi-hop complex modified discrete cosine transform (IMH-CMDCT) may be applied to sub-band representations of the far-end and near-end audio to obtain reconstructed time domain representations of the far-end and near-end audio. Similar to the MH-CMDCT, the IMH-CMDCT may also allow the use of a configurable window hop size as described above. Prior to application of the MH-CMDCT, a window tightening procedure may be applied to the windows corresponding to the time domain representations of the far-end and near-end audio. Additionally, prior to application of the IMH-CMDCT, the window tightening procedure may be applied to the windows corresponding to the sub-band domain representations of the far-end and near-end audio. The application of the window tightening procedure on the analysis windows (the time-domain windows) and the synthesis windows (the sub-band domain windows) may ensure that they jointly act as a tight frame, thereby helping to ensure that time-domain aliasing cancellation still works.

As also described herein, a state-space model, such as a Kalman filtering technique, may be used to estimate both the acoustic path from the audio output component (e.g., loudspeaker) to the audio input component (e.g., microphone) and to estimate the clock skew in an alternating order. For example, a first acoustic path estimate may be followed by a first clock skew estimate, which may be followed by a second acoustic path estimate, which may be followed by a second clock skew estimate, and so on. The term state-space model, as used herein, refers to a model of a physical system as a set of input, output and state variables having given mathematical relationships. Specifically, according to the described techniques, each acoustic path estimate may be calculated based, at least in part, on a preceding acoustic path estimate and a preceding clock skew estimate. Additionally, each clock skew estimate may be calculated based at least in part on two preceding acoustic path estimates, such as based on differences between the two preceding acoustic path estimates. The use of the state-space model may be based on the relationships between the clock skew and the acoustic path. For example, the clock skew may cause a delay associated with the acoustic path to appear to gradually increase or decrease over time. If a loudspeaker is being sampled more frequently than a microphone, then a delay associated with the acoustic path may appear to gradually decrease over time. Accordingly, in some examples, when the loudspeaker is being sampled more frequently than the microphone, the loudspeaker signal may be filtered based on the acoustic path to generate a replica of the echo, and the delay associated with the acoustic path may be increased by the amount of the previous estimated clock skew in order to determine a location at which to remove the replica of the echo from the microphone signal.

By contrast, if the microphone is being sampled more frequently than the loudspeaker, then a delay associated with the acoustic path may appear to gradually increase over time. Accordingly, in some examples, when the microphone is being sampled more frequently than the loudspeaker, the loudspeaker signal may be filtered based on the acoustic path to generate a replica of the echo, and the delay associated with the acoustic path may be decreased by the amount of the previous estimated clock skew in order to determine a location at which to remove the replica of the echo from the microphone signal.

The Kalman filter is robust to Gaussian noise since it is a linear unbiased estimator in the presence of Gaussian noise. However, the Kalman filter is sensitive to non-Gaussian disturbances such as speech onsets and transient noises. It is noted that many audio disturbances that are relevant to AEC, such as speech onsets, follow a non-Gaussian (e.g., super-Gaussian) distribution. Accordingly, in the described techniques, in order to make the Kalman filtering technique robust to non-Gaussian disturbances, a Kalman filtering optimization criterion may be augmented with an auxiliary constraint that corresponds to a non-Gaussian (e.g., super-Gaussian) distribution.

FIG. 1 is a diagram illustrating an example clock skew robust AEC system that may be used in accordance with the present disclosure. As shown in FIG. 1, far-end audio 111 may be output by an audio output component 121, such as a loudspeaker. The audio output component 121 may be located at a near-end location 172. The far-end audio 111 may be captured at a far-end location 171, for example via a microphone (not shown in FIG. 1) at the far-end location 171. The far-end audio 111 may then be transmitted to the near-end location 172. As also shown in FIG. 1, near-end audio 112 may be captured by an audio input component 122 (e.g., microphone) at the near-end location 172. In this example, the near-end audio 112 includes near-end speech 142, which may include speech spoken by a person at the near-end location 172. Additionally, the near-end audio 112 also includes noise 143. Furthermore, the near-end audio 112 also includes echo 141, which is caused by the far-end audio 111 from audio output component 121.

In some examples, FIG. 1 may relate to a teleconferencing scenario in which a teleconference occurs between a person at a far-end location 171 and a person at a near-end location 172. As should be appreciated, it is not desirable for the echo 141 to be sent back to the near-end location 172. Accordingly, an echo removal 152 may be performed in order to remove the echo 141 from the near-end audio 112. In the example, of FIG. 1, the echo removal 152 is performed by clock skew robust acoustic echo cancellation CSR-AEC component 100. Specifically, CSR-AEC component 100 may estimate a model of the acoustic path from the audio output component 121 to the audio input component 122. The CSR-AEC component 100 may then filter the far-end audio 111 with this estimated acoustic path model to generate echo replica 151, which is a replica of the echo 141 in the near-end audio 112. The echo replica 151 may then be subtracted from the near-end audio 112 to generate AEC output 160. The AEC output 160 may then be transmitted back to the far-end location 171 and played, such as via a loudspeaker (not shown in FIG. 1) at the far-end location 171. If the estimated filter coefficients of the estimated acoustic path model are equal to the true transfer path, then all of the echo 141 will be removed from the near-end audio 112.

As shown in FIG. 1, a far-end sampling rate 131 is used to sample the far-end audio 111 output by audio output component 121. Additionally, a near-end sampling rate 132 is used to sample the near-end audio 112 captured by audio input component 122. In the example of FIG. 1, the far-end sampling rate 131 is not the same as the near-end sampling rate 132. Specifically, in this example, the far-end sampling rate 131 is 48,000.9 Hertz (Hz), and the near-end sampling rate 132 is 47,999.7 Hz. Thus, in this example, there is a clock skew caused by the difference between the far-end sampling rate 131 and the near-end sampling rate 132. In traditional AEC systems, which are not robust to clock skew, even this small (less than .5 Hz) difference between the far-end sampling rate 131 and the near-end sampling rate 132 may cause a substantial performance drop in AEC.

In contrast to these traditional AEC systems, the CSR-AEC component 100 is robust to clock skew. As described in detail below, in order to be robust to clock skew, the CSR-AEC component 100 employs a state-space model 103 (e.g., one or more Kalman filters) that blindly accounts for the clock skew between the audio output component 121 and the audio input component 122 without the need for exchanging timestamps when they have independent clocks. The state-space model 103 may be robust to both Gaussian and super-Gaussian near-end noises. According to the techniques described herein, the state-space model 103 may be used with a state-space transition matrix that is not fixed and that is instead an explicit estimation, which is state-space transition matrix estimation 104 of FIG. 4. Specifically, the state-space transition matrix estimation 104 may correspond to the estimated clock skew. Techniques for using the state-space model 103 to perform clock skew estimations and acoustic path estimations are described in detail below. The state-space model 103 may be implemented in a sub-band domain based on multi-hop complex modified discrete cosine transform (MH-CMDCT) 101 and inverse multi-hop complex modified discrete cosine transform (IMH-CMDCT) 102, which are variations of the complex modified discrete cosine transform (CMDCT). For example, the MH-CMDCT 101 and IMH-CMDCT 102 may allow for a configurable hop size and, therefore, enhanced time resolution, thereby allowing closer monitoring of changes to the acoustic path and clock skew.

Figure 2:
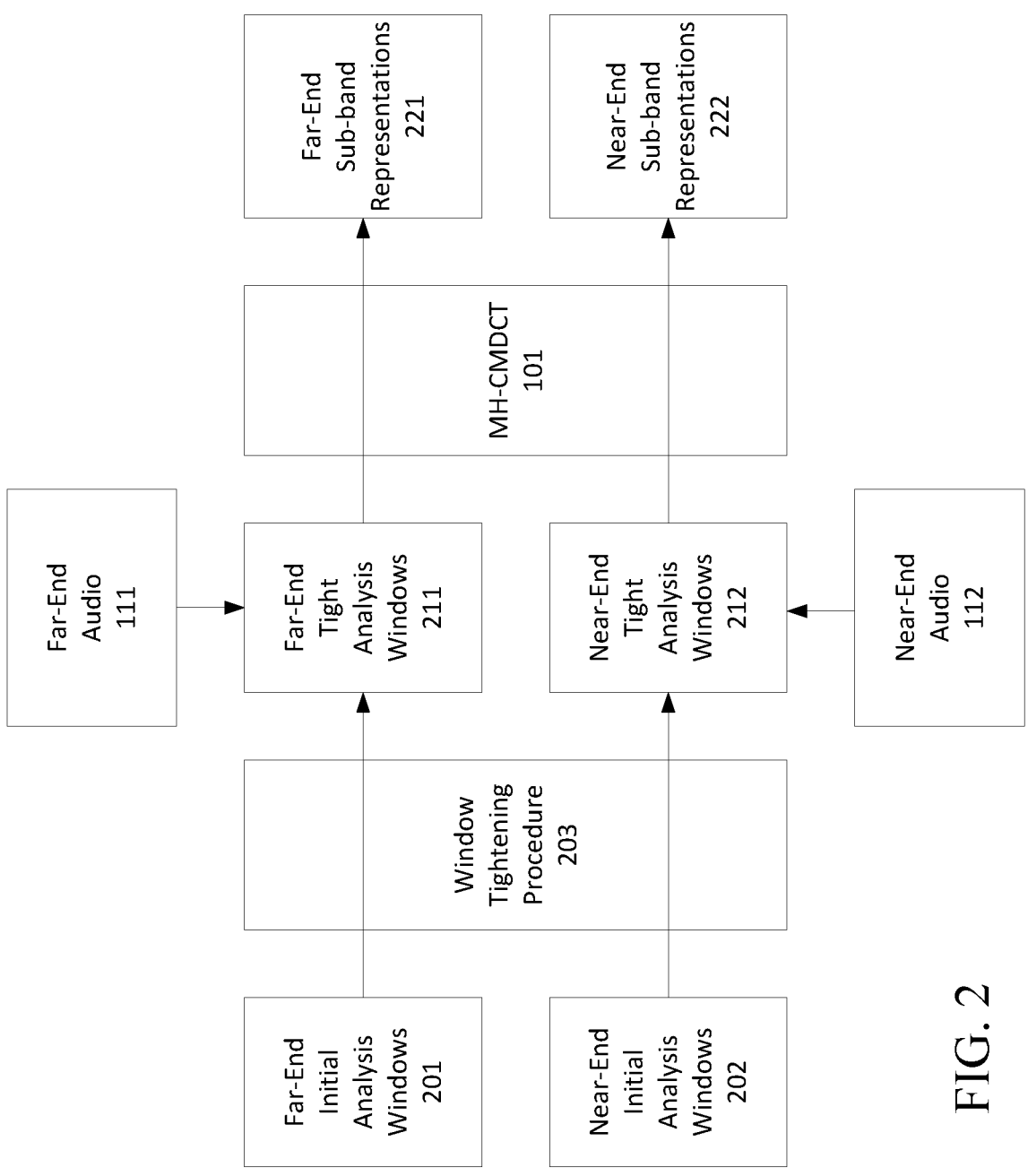
FIG. 2 is a diagram illustrating example time domain to sub-band domain transform techniques that may be used in accordance with the present disclosure.

Referring now to FIG. 2, some examples of time domain to sub-band domain transform techniques will now be described in detail. In this example, far-end initial analysis windows 201 may be formed based on the window size (selected number of samples per window) and hop size (selected overlap between windows) that is selected for the AEC procedure. Window tightening procedure 203 may then be applied to the far-end initial analysis windows 201 to change the far-end initial analysis windows 201 to far-end tight analysis windows 211. The application of the window tightening procedure 203 to the analysis windows (e.g., far-end initial analysis windows 201 and near-end initial analysis windows 202 of FIG. 2) and the synthesis windows (e.g., far-end initial synthesis windows 301 and near-end initial synthesis windows 302 of FIG. 3) may ensure that they jointly act as a tight frame, thereby helping to ensure that time-domain aliasing cancellation still works. Example details of the window tightening procedure 203 are described in detail below with reference to FIG. 4. As shown in FIG. 2, the far-end tight analysis windows 211 correspond to far-end audio 111. The MH-CMDCT 101 may then be applied to far-end tight analysis windows 211 to transform the far-end tight analysis windows 211 from the time domain to the sub-band domain. The output of the MH-CMDCT 101 are far-end sub-band representations 221. The MH-CMDCT 101 may allow for a configurable hop size and, therefore, enhanced time resolution, thereby allowing closer monitoring of changes to the acoustic path and clock skew. Example of the details of MH-CMDCT 101 are described in detail below with reference to FIG. 5.

Also, in this example, near-end initial analysis windows 202 may be formed based on the window size (selected number of samples per window) and hop size (selected overlap between windows) that is selected for the AEC procedure. Window tightening procedure 203 may then be applied to the near-end initial analysis windows 202 to change the near-end initial analysis windows 202 to near-end tight analysis windows 212. As shown in FIG. 2, the near-end tight analysis windows 212 correspond to near-end audio 112. The MH-CMDCT 101 may then be applied to near-end tight analysis windows 212 to transform the near-end tight analysis windows 212 from the time domain to the sub-band domain. The output of the MH-CMDCT 101 are near-end sub-band representations 222.

Figure 3:
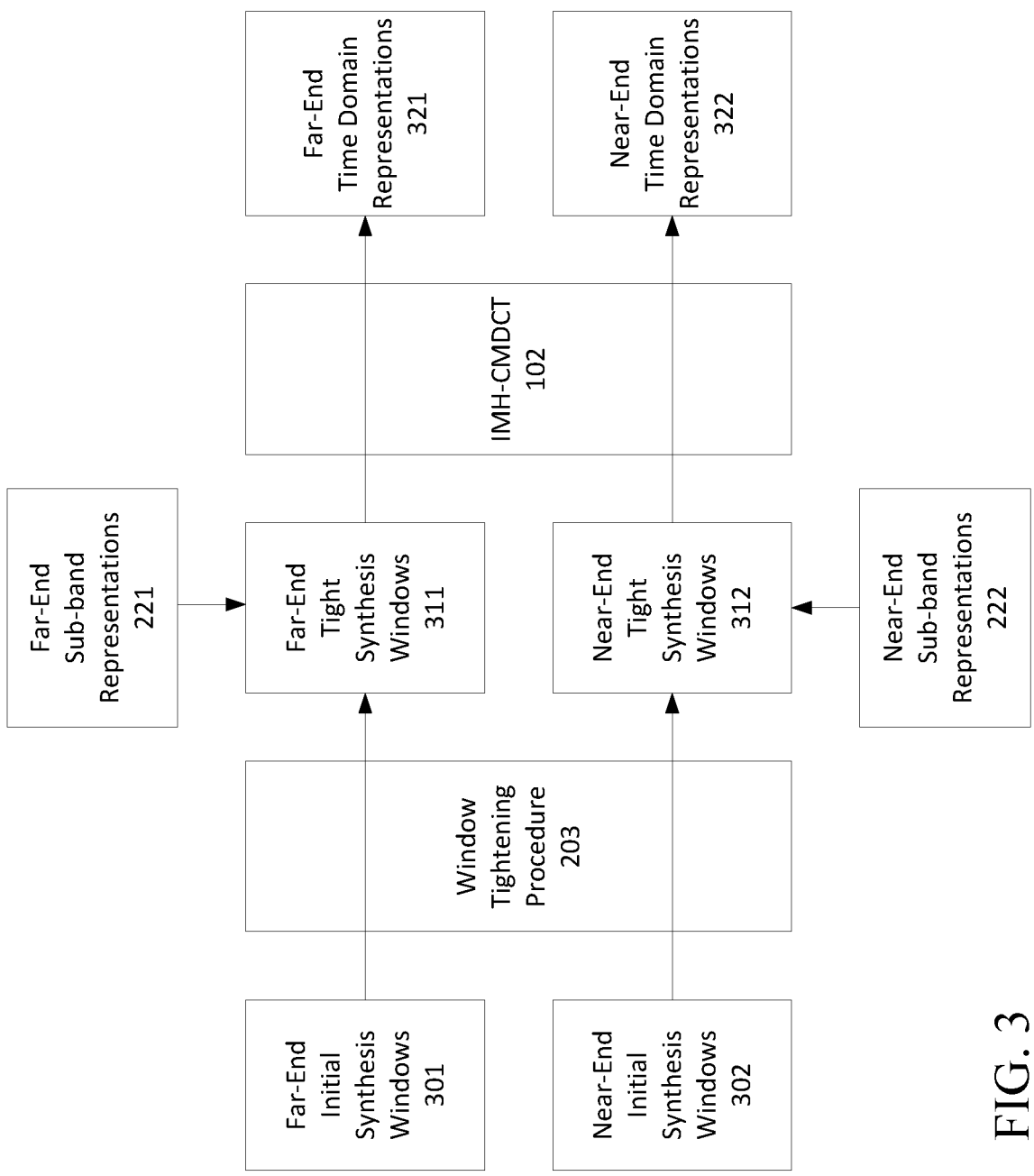
FIG. 3 is a diagram illustrating example sub-band domain to time domain transform techniques that may be used in accordance with the present disclosure.

Referring now to FIG. 3, some examples of sub-band domain to time domain transform techniques will now be described in detail. Specifically, after the far-end sub-band representations 221 and near-end sub-band representations 222 are analyzed and processed in the sub-band domain, they may be transformed back to the time domain. In this example, far-end initial synthesis windows 301 may be formed based on the window size (selected number of samples per window) and hop size (selected overlap between windows) that is selected for the AEC procedure. Window tightening procedure 203 may then be applied to the far-end initial synthesis windows 301 to change the far-end initial synthesis windows 301 to far-end tight synthesis windows 311. As shown in FIG. 3, the far-end tight synthesis windows 311 correspond to far-end sub-band representations 221. The IMH-CMDCT 102 may then be applied to far-end tight synthesis windows 311 to transform the far-end tight synthesis windows 311 from the sub-band domain to the time domain. The output of the IMH-CMDCT 102 are far-end time domain representations 321. Example details of IMH-CMDCT 102 are described in detail below with reference to FIG. 6.

Also, in this example, near-end initial synthesis windows 302 may be formed based on the window size (selected number of samples per window) and hop size (selected overlap between windows) that is selected for the AEC procedure. Window tightening procedure 203 may then be applied to the near-end initial synthesis windows 302 to change the near-end initial synthesis windows 302 to near-end tight synthesis windows 312. As shown in FIG. 3, the near-end tight synthesis windows 312 correspond to near-end sub-band representations 222. The IMH-CMDCT 102 may then be applied to near-end tight synthesis windows 312 to transform the near-end tight synthesis windows 312 from the sub-band domain to the time domain. The output of the IMH-CMDCT 102 are near-end time domain representations 322.

Figure 4:
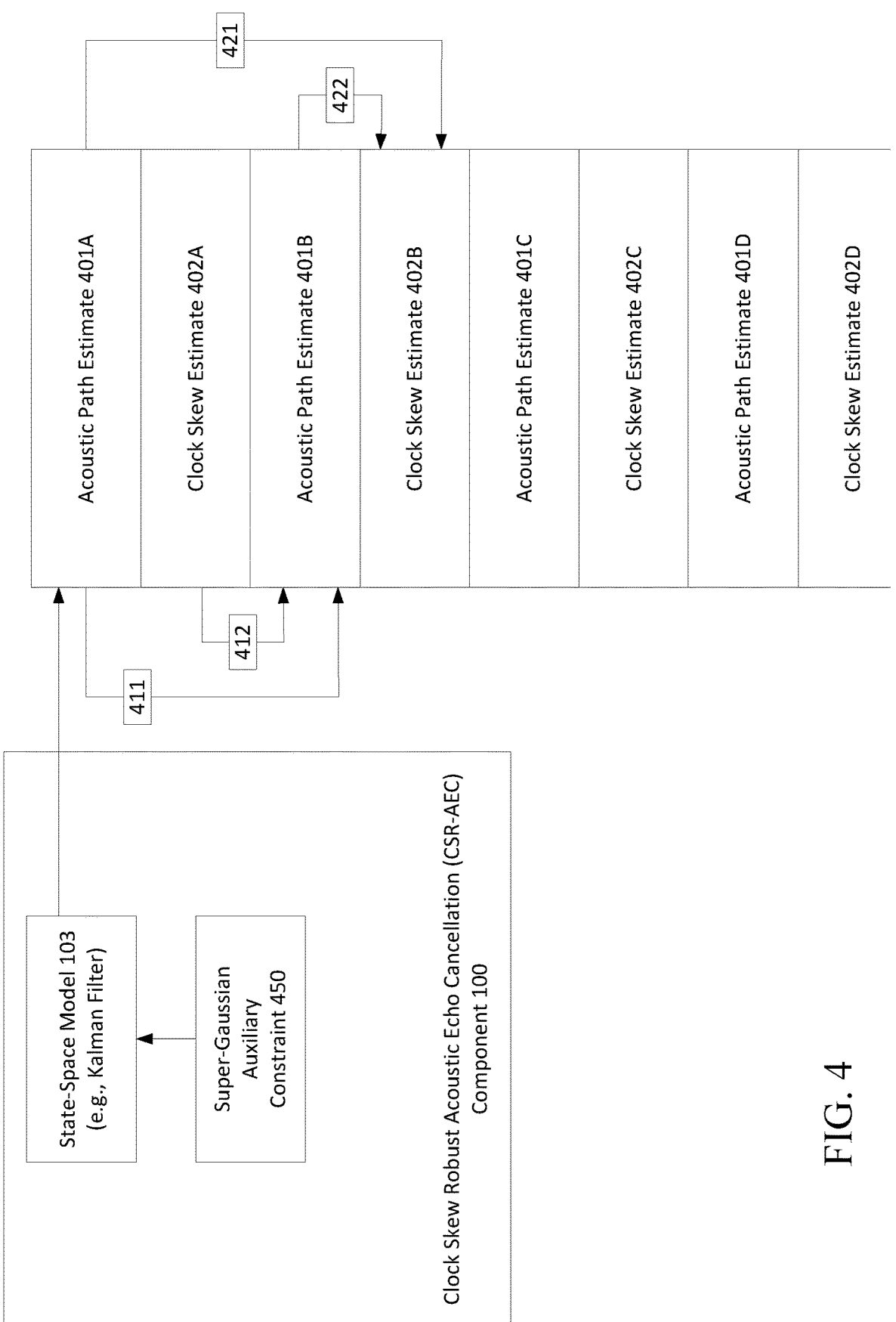
FIG. 4 is a diagram illustrating example state-space model estimations that may be used in accordance with the present disclosure.

Referring now to FIG. 4, some examples of state-space model estimations will now be described in detail. As shown in FIG. 4, CSR-AEC component 100 employs a state-space model 103, such as a Kalman filtering technique, which may be used to estimate the acoustic path from the audio output component 121 to the audio input component 122 and to estimate the clock skew in an alternating order. In the example of FIG. 4, acoustic path estimate 401A is followed by clock skew estimate 402A, which is followed by acoustic path estimate 401B, which is followed by clock skew estimate 402B, which is followed by acoustic path estimate 401C, which is followed by clock skew estimate 402C, which is followed by acoustic path estimate 401D, which is followed by clock skew estimate 402D. The use of the state-space model 103 may be based on the relationships between the clock skew and the acoustic path.

According to the described techniques, each acoustic path estimate may be calculated based, at least in part, on a preceding acoustic path estimate and a preceding clock skew estimate. For example, as shown in FIG. 4, acoustic path estimate 401B may be calculated based on the immediately preceding acoustic path estimate, which is acoustic path estimate 401A, and the immediately preceding clock skew estimate, which is clock skew estimate 402A. The term immediately preceding, as used herein, refers to a preceding estimate that comes before another estimate with no intervening estimates of the same type as the preceding estimate. For example, there are no intervening acoustic path estimates between acoustic path estimate 401A and acoustic path estimate 401B. Thus, acoustic path estimate 401A immediately precedes acoustic path estimate 401B. Additionally, there are no intervening clock skew estimates between clock skew estimate 402A and acoustic path estimate 401B. Thus, clock skew estimate 402A also immediately precedes acoustic path estimate 401B. The term immediately preceding does not require that the estimates must be made after each other instantaneously with no intervening time. In FIG. 4, arrows 411 and 412 indicate that acoustic path estimate 401B is calculated based on acoustic path estimate 401A and clock skew estimate 402A, respectively.

Additionally, each clock skew estimate may be calculated based at least in part on two preceding acoustic path estimates, such as based on differences between the two preceding acoustic path estimates. For example, as shown in FIG. 4, clock skew estimate 402B may be calculated based on the two immediately preceding acoustic path estimates, which are acoustic path estimates 401A and 401B. In FIG. 4, arrows 421 and 422 indicate that clock skew estimate 402B is calculated based on acoustic path estimate 401A and acoustic path estimate 401B, respectively.

The Kalman filter is robust to Gaussian noise since it is a linear unbiased estimator in the presence of Gaussian noise. However, the Kalman filter is sensitive to non-Gaussian disturbances such as speech onsets and transient noises. It is noted that many audio disturbances that are relevant to AEC, such as speech onsets, follow a non-Gaussian (e.g., super-Gaussian) distribution. Accordingly, as shown in FIG. 4, in order to make the state-space model 103 (e.g., Kalman filtering technique) robust to non-Gaussian disturbances, an optimization criterion of the state-space model 103 may be augmented with a super-Gaussian auxiliary constraint 450 that corresponds to a super-Gaussian distribution. An example of the super-Gaussian auxiliary constraint 450 is shown in mathematical representation 1101A of FIG. 11.

As described above with reference to FIGS. 2 and 3, the window tightening procedure 203 may be applied to the analysis windows (e.g., far-end initial analysis windows 201 and near-end initial analysis windows 202 of FIG. 2) and the synthesis windows (e.g., far-end initial synthesis windows 301 and near-end initial synthesis windows 302 of FIG. 3) to ensure that they jointly act as a tight frame, thereby helping to ensure that time-domain aliasing cancellation still works. Referring now to FIG. 5, some example details of window tightening procedure 203 will now be described. As shown in FIG. 5, the inputs to the window tightening procedure 203 may include the initial analysis windows (e.g., far-end initial analysis windows 201 and near-end initial analysis windows 202 of FIG. 2) and the initial synthesis windows (e.g., far-end initial synthesis windows 301 and near-end initial synthesis windows 302 of FIG. 3). The inputs to the window tightening procedure 203 may also include the window size $N_w$ and the hop size $N_h$. As also shown in FIG. 5, the outputs of the window tightening procedure 203 may include tight analysis windows $w_a(n)$ (e.g., far-end tight analysis windows 211 and near-end tight analysis windows 212 of FIG. 2) and tight synthesis windows $w_s(n)$ (e.g., far-end tight synthesis windows 311 and near-end tight synthesis windows 312 of FIG. 3). In the example of FIG. 5, window tightening procedure 203 includes acts corresponding to lines 501-509. Line 501 starts a first FOR loop that is performed for (n) belonging to 0 to $N_w - 1$, which corresponds to the window size. Line 502 sets the current window as corresponding to the initial analysis or synthesis window. Line 503 ends the first FOR loop. Line 504 sets the current window as having a value of 0 for (n) being less than 0 or for (n) being greater than or equal to $N_w$, which corresponds to outside the window size. Line 505 starts a second FOR loop that is performed for (n) belonging to 0 to $N_w - 1$, which corresponds to the window size. In lines 506-508, the windows are weighted sample-wise to ensure the overall response of the filter is the identity function, and the tight output windows $w_a(n)$ and $w_s(n)$ are calculated. Line 509 ends the second FOR loop.

As described above with reference to FIG. 2, the MH-CMDCT 101 may be applied to far-end tight analysis windows 211 and near-end tight analysis windows 212 to transform them from the time domain to the sub-band domain. As also described above, the MH-CMDCT 101 may allow for a configurable hop size and, therefore, enhanced time resolution, thereby allowing closer monitoring of changes to the acoustic path and clock skew: Referring now to FIG. 6, some example details of MH-CMDCT 101 will now be described. As shown in FIG. 6, the parameters for the MH-CMDCT 101 may include the tight analysis windows $w_a(n)$ (e.g., far-end tight analysis windows 211 and near-end tight analysis windows 212 of FIG. 2) that may be calculated using the window tightening procedure 203 of FIG. 5. The parameters for the MH-CMDCT 101 may also include the window size $N_w$ and the hop size $N_h$. As also shown in FIG. 6, the inputs to the MH-CMDCT 101 may include the time domain representation of the signal x(n), which may be the time-domain representation of either the far-end audio 111 or the near-end audio 112. As also shown in FIG. 6, the outputs of the MH-CMDCT 101 may include the sub-band domain representation of the signal x(n), which may be the far-end sub-band representations 221 or the near-end sub-band representations 222 of FIG. 2. In the example of FIG. 6, MH-CMDCT 101 includes acts corresponding to lines 601-609. In line 601, a variable Delta is defined based on the window size $N_w$. In line 602, an outer FOR loop is started for each time value (1). In line 603, a function $x_1(n)$ is defined for the current (1) value. In line 604, a function x-tilde$_1$(n) is defined based on $x_1(n)$ from line 603. In line 605, a nested FOR loop is defined for sub-band (k) values. In line 606, a function v(k) is defined for the current value of (k), which makes use of the x-tilde$_1$ (n) function defined previously in line 604. In line 607, the sub-band representation output is defined for the current values of (k) and (1), which makes use of the v(k) function defined previously in line 606 and the Delta variable defined in line 601. The letter (j) in FIGS. 6 and 7 denotes an imaginary number (the square root of −1). In line 608, the nested FOR loop is ended. In line 609, the outer FOR loop is ended.

As described above with reference to FIG. 3, the IMH-CMDCT 102 may be applied to far-end tight synthesis windows 311 and near-end tight synthesis windows 312 to transform them from the sub-band domain to the time domain. Referring now to FIG. 7, some example details of IMH-CMDCT 102 will now be described. As shown in FIG. 7, the parameters for the IMH-CMDCT 102 may include the tight synthesis windows $w_s(n)$ (e.g., far-end tight synthesis windows 311 and near-end tight synthesis windows 312 of FIG. 3) that may be calculated using the window tightening procedure 203 of FIG. 5. The parameters for the IMH-CMDCT 102 may also include the window size $N_w$ and the hop size $N_h$. As also shown in FIG. 7, the inputs to the IMH-CMDCT 102 may include the sub-band domain representation $X_{k,1}$. As also shown in FIG. 7, the outputs of the IMH-CMDCT 102 may include the time domain representation of the signal x(n), which may be the far-end time domain representations 321 or the near-end time domain representations 322 of FIG. 3. In the example of FIG. 7, IMH-CMDCT 102 includes acts corresponding to lines 701-712. In line 701, a variable Delta is defined based on the window size $N_w$. In line 702, an outer FOR loop is started for each time value (l). In line 703, a first nested FOR loop is started for each sub-band (k) value. In line 704, a function (k) is defined for the current (k) value. In line 705, a function $v(N_w-k-1)$ is defined. In line 706, the first nested FOR loop is ended. In line 707, a second nested FOR loop is started for each (n) value. In line 708, a function x-tilde (n) is defined for the current value of (n). In line 709, the first nested FOR loop is ended. In line 710, a function $x_1(n)$ is defined based on the x-tilde$_1$ (n) function from line 708. In line 711, the outer FOR loop is ended. In line 712, the time domain representation is calculated based on the sum of each $x_1(n)$ function for each value of (l).

As described above with reference to FIG. 4, a state-space model 103 may be employed to perform estimations of the acoustic path (from audio output component 121 to audio input component 122) and estimations of the clock skew. The logic used to implement the state-space model 103 will now be described in detail. Specifically, since the audio data may be processed in blocks and to make the arithmetic tractable, it may be assumed that the expansion over time can be approximated by a shift in each block. As set forth above, the window size $N_w$ and the hop size $N_h$ may be used to calculate the sub-band representations. Then, in the absence of skew, the (1)th sub-band representation microphone signal may be calculated from a block of samples given by $d((N_h1+n)=f_p)$ for n=0, 1, . . . $N_w-1$. However, in the presence of skew, the block that is used to calculate the sub-band representation would be $d((N_h1+n)/(f_p+\delta))$ for n=0, 1, . . . $N_w-1$. This block can be approximated by d $((N_h1+n)/f_p+N_h1\delta/f_p^2)$ for n=0, 1 . . . $N_w-1$.

The above observations support formulating the block skew in a state-space tracking framework where the state transition is determined by the clock skew. In this formulation, the state is the acoustic path between the audio output component 121 and the audio input component 122. The notation $h_{k,1}$ is used to denote the channel at block 1 for sub-band k modeled as a finite impulse response (FIR) filter of length M. Then, a state equation with a vector valued function θ may be given by mathematical representation 801 of FIG. 8. In mathematical representation 801, $u_{k,1}$ is the control input (innovation) and $v_{k,1}$ is the process noise with the covariance shown in mathematical representation 802. The expectation and the Hermitian transpose are indicated in mathematical representation 802.

A special case of a linear Gauss-Markov model is indicated by mathematical representation 803 of FIG. 8. In mathematical representation 803, $A_k$ represents a state transition matrix. The measurement equation is given by mathematical representation 804, in which $\varepsilon_{k,1}$ is the measurement noise for sub-band (k) and at block (1) with the covariance shown in mathematical representation 805. An adaptive filter may be used to the auxiliary cost function as shown in mathematical representation 901A of FIG. 9. The meaning of various symbols used in mathematical representation 901A is indicated in remark 901B. Additionally, remark 901C indicates how a Toeplitz constraint may be obtained. It is further noted that the oracle transition matrix A for all sub-bands when δ is known is given by mathematical representation 902. In relation to mathematical representation 902, diag(y) creates a diagonal matrix with the elements of vector (y). Once $A_k$ is calculated, then a Kalman filter may be used that operates on mathematical representations 803 and 804 of FIG. 8.

It is noted that, periodically, the accumulated delay may become greater than a sample which is preserved as a sudden change in the channel. To solve this issue, a longer buffer may be used for the far-end signal in low frequency sub-bands. Then, the peak value of the estimated channel in those sub-bands may be used to adjust the beginning far-end buffers for all the sub-bands.

As described herein, a state-space model 103 (e.g., Kalman filtering approach) may be used to estimate both the acoustic path and the skew correction term in an alternating manner. A Kalman filter implements an optimal tracker in the least-squares sense by minimizing the cost function, as shown in mathematical representation 1001 of FIG. 10, with respect to $h_{k,1}$ for all (1). In mathematical representation 1001, λ is the Lagrangian. Minimization of this cost function may lead to a one-step point Kalman as shown in mathematical representation 1002 of FIG. 10. In mathematical representation 1002, $$\upsilon_i^2$$

denotes the inverse of the Hessian. Also, in mathematical representation 1002, the sub-band index dependency is omitted for notational clarity.

Typically, direct implementation of the Kalman estimation suffers from instabilities and is sensitive to ill-conditioning. Better numerical properties are obtained by expressing the Kalman filter in the covariance form, for which the update-equation is shown in mathematical representation 1003 of FIG. 10. Using the square root form, the update quantities are given by mathematical representation 1101 of FIG. 11. In mathematical representation 1101, Q is a unitary matrix designed to obtain a matrix with the triangular structure.

The Kalman filter is robust to Gaussian noise since it is a linear unbiased estimator in the presence of Gaussian noise. However, the Kalman filter is sensitive to non-Gaussian disturbances such as speech onsets and transient noises. In the Kalman filter, the Gaussian bias term is already accounted for. As described above, in order to make a Kalman filter robust, the Kalman optimization criterion may be augmented with a super-Gaussian auxiliary constraint 450 of FIG. 4. An example of the super-Gaussian auxiliary constraint 450 is shown in mathematical representation 1102A of FIG. 11. Mathematical representation 1102A includes remark box 1102B, which explains various concepts and notations associated with mathematical representation 1102A. In remark box 1101B, lower-case kappa $\kappa_0$ is a constant controlling the robustness of the algorithm and lower-case iota $l_{k,1}$ is a scale factor which quantifies the error spread and can be estimated recursively with a forgetting factor and a normalization constant (β) as shown in Mathematical representation 1103.

Referring now to FIG. 12, an example of a Kalman filtering technique 1200 will now be described in detail. As shown in FIG. 12, the inputs to Kalman filtering technique 1200 include the far-end audio 111 from audio output component 121 (referred to in FIG. 12 as the loudspeaker signal $X_{k,1}$) and the near-end audio 112 from audio input component 122 (referred to in FIG. 12 as the microphone signal $D_{k,1}$) for all k,l values, where k represents sub-band values and l represents time values. As shown in FIG. 12, the outputs of Kalman filtering technique 1200 include the sub-band estimate of the near-end error ($e_1$), which in this example corresponds to the AEC output 160 of FIG. 1. As described above, the AEC output 160 (in this example corresponding to $e_1$) is obtained by removing the replica of the echo from the near-end audio 112. In the example of FIG. 12, Kalman filtering technique 1200 includes acts corresponding to lines 1201-1216. At line 1201, variables are initialized, including setting $\mho_{k,0}$ to J, which is the anti-diagonal identity matrix. As described above, lower-case (h) represents the acoustic path and (A) represents the clock skew. Additionally, $\mho$ represents the square root of the inverse of the Hessian matrix. Additionally, ζ represents the averaged near-end estimate, which corresponds to a stationary point of the error. At line 1202, an outer FOP loop is started for each time (1) value. At line 1203, a nested FOR loop is started belonging to all sub-band values. At line 1204, the loudspeaker signal $x_{k,1}$ is buffered with the variable (M) representing a number of taps. It is noted that, in the techniques described herein, different quantities of taps may be used for different sub-bands when calculating the plurality of acoustic path estimates and the plurality of clock skew estimates. At line 1205, the error for a given sub-band and time ($E_{k,1}$) is obtained by subtracting the replica of the echo from the microphone signal. At line 1206, the estimated error energy is obtained. At line 1207, the Kalman filter updating is performed as shown in mathematical representation 1101 of FIG. 11. At 1208, the Kalman gain (bold k over-lined) is weighted using the posterior error. At line 1209, an IF statement is defined based on the calculated error $E_{k,1}$ for each sub-band (k). Specifically, if the analyzed signal is not estimated to be contaminated by a super-Gaussian signal (e.g., speech signal), then line 1210 will be performed. By contrast, if the analyzed signal is estimated to be contaminated by a super-Gaussian signal (e.g., speech signal), then it is capped as shown in line 1211. As shown, if the condition of line 1209 is met, then Zeta is defined as shown in line 1210. Otherwise, Zeta is defined as shown in line 1211. At line 1213, the IF statement is ended. Thus, the error is unbiased at lines 1209-1212. At line 1214, the current acoustic path $h_{k,1}$ is estimated based on the prior acoustic path $h_{k,1-1}$ and the weighted Kalman gain (from line 1208) multiplied by the unbiased error. At line 1215, the nested FOR loop is ended. At line 1216, the sub-band estimate of the near-end error ($e_1$) is calculated based on the error for each sub-band (k). At line 1217, the outer FOR loop is ended.

Referring now to FIG. 13, an example of a clock skew estimation technique 1300 will now be described in detail. As shown in FIG. 13, the inputs to clock skew estimation technique 1300 include the far-end audio 111 from audio output component 121 (referred to in FIG. 13 as the loudspeaker signal $X_{k,1}$) and the near-end audio 112 from audio input component 122 (referred to in FIG. 13 as the microphone signal $D_{k,1}$) for all k,l values, where k represents sub-band values and l represents time values. As shown in FIG. 13, the outputs of clock skew estimation technique 1300 include the estimate of the skew correction filter $A_{k,1}$. In the example of FIG. 13, clock skew estimation technique 1300 includes acts corresponding to lines 1301-1316. At line 1301, variables are initialized. As described above, lower-case (h) represents the acoustic path. Lower case (f) represents the frequency index withing a sub-band signal. Additionally, $\mho$ represents the square root of the inverse of the Hessian matrix. Additionally, Gamma squared ($\gamma^2$) in line 1308 represents the a priori error corresponding to a proxy for the background noise, with Gamma ($\gamma$) being the square root of Gamma squared. At line 1302, an outer FOP loop is started for each time (1) value. At line 1303, a first nested FOR loop is started belonging to all sub-band values. At line 1304, zero padding is performed on the acoustic path. At line 1305, a fast Fourier transform (FFT) is performed on the zero padded acoustic path. At line 1306, a second nested FOR loop for each (f) value is started within the first nested FOR loop. At line 1307, the error is calculated. At line 1309, a Kalman update is performed. At 1310, the Kalman gain (bold k) is weighted using the posterior error. At line 1311, the state transition matrix is updated. At line 1312, the second nested FOR loop is ended. At line 1313, the first nested FOR loop is ended. At line 1314, the skew correction in the frequency domain is determined based on the diagonal of A for each sub-band and time. At line 1315, A is converted back into the original domain using an inverse FFT operator. Additionally, a column vector is converted into a covariance matrix, and a convolution matrix (P) is returned such that the product of (P) and a vector (q) is the convolution of (p) and (q). At line 1316, the outer FOR loop is ended.

FIG. 14 is a flowchart illustrating an example clock skew robust AEC process that may be used in accordance with the present disclosure. In some examples, operations 1410-1418 of FIG. 14 may be performed by CSR-AEC component 100 of FIG. 1. At operation 1410, far-end audio samples are received corresponding to far-end audio that is output from one or more audio output components at a near-end location, wherein the far-end audio is captured at a far-end location and transmitted to the near-end location. As described above with reference to FIG. 1, far-end audio 111 may be output by an audio output component 121, such as a loudspeaker. The audio output component 121 may be located at a near-end location 172. The far-end audio 111 may be captured at a far-end location 171, for example via a microphone (not shown in FIG. 1) at the far-end location 171, and the far-end audio 111 may then be transmitted to the near-end location 172. The far-end audio samples may be received by CSR-AEC component 100. A far-end sampling rate 131 is used to sample the far-end audio 111 output by audio output component 121. Thus, the far-end audio samples may be sampled according to the far-end sampling rate 131.

At operation 1412, near-end audio samples are received corresponding to near-end audio that is captured by one or more audio input components at the near-end location. As described above with reference to FIG. 1, near-end audio 112 may be captured by an audio input component 122 (e.g., microphone) at the near-end location 172. In this example, the near-end audio 112 includes near-end speech 142, which may include speech spoken by a person at the near-end location 172. Additionally, the near-end audio 112 also includes noise 143. Furthermore, the near-end audio 112 also includes echo 141, which is caused by the far-end audio 111 from audio output component 121. The near-end audio samples may be received by CSR-AEC component 100. A near-end sampling rate 132 is used to sample the near-end audio 112 captured by audio input component 122. In the example of FIG. 1, the far-end sampling rate 131 is not the same as the near-end sampling rate 132. Specifically, in this example, the far-end sampling rate 131 is 48,000.9 Hertz (Hz), and the near-end sampling rate 132 is 47,999.7 Hz. Thus, in this example, there is a clock skew caused by the difference between the far-end sampling rate 131 and the near-end sampling rate 132.

At operation 1414, a plurality of acoustic path estimates and a plurality of clock skew estimates are calculated, using a state-space model, based at least in part on the far-end audio samples and the near-end audio samples, wherein the plurality of acoustic path estimates and the plurality of clock skew estimates are calculated in an alternating order, and wherein a first acoustic path estimate of the plurality of acoustic path estimates and a first clock skew estimate of the plurality of clock skew estimates are used to calculate a second acoustic path estimate of the plurality of acoustic path estimates. The plurality of acoustic path estimates may approximate an acoustic path between the one or more audio output components and the one or more audio input components. The plurality of clock skew estimates may approximate a clock skew caused by a difference between a far-end sampling rate of the one or more audio output components and a near-end sampling rate of the one or more audio input components.

As described above with reference to FIG. 4, CSR-AEC component 100 employs a state-space model 103, such as one or more Kalman filtering techniques, which may be used to estimate the acoustic path from the audio output component 121 to the audio input component 122 and to estimate the clock skew in an alternating order. In the example of FIG. 4, acoustic path estimate 401A is followed by clock skew estimate 402A, which is followed by acoustic path estimate 401B, which is followed by clock skew estimate 402B, which is followed by acoustic path estimate 401C, which is followed by clock skew estimate 402C, which is followed by acoustic path estimate 401D, which is followed by clock skew estimate 402D. The use of the state-space model 103 may be based on the relationships between the clock skew and the acoustic path.

According to the described techniques, each acoustic path estimate of the plurality of acoustic path estimates may be calculated based, at least in part, on a preceding acoustic path estimate and a preceding clock skew estimate. For example, as shown in FIG. 4, acoustic path estimate 401B may be calculated based on the immediately preceding acoustic path estimate, which is acoustic path estimate 401A, and the immediately preceding clock skew estimate, which is clock skew estimate 402A. The term immediately preceding, as used herein, refers to a preceding estimate that comes before another estimate with no intervening estimates of the same type as the preceding estimate. For example, there are no intervening acoustic path estimates between acoustic path estimate 401A and acoustic path estimate 401B. Thus, acoustic path estimate 401A immediately precedes acoustic path estimate 401B. Additionally, there are no intervening clock skew estimates between clock skew estimate 402A and acoustic path estimate 401B. Thus, clock skew estimate 402A also immediately precedes acoustic path estimate 401B. The term immediately preceding does not require that the estimates must be made after each other instantaneously with no intervening time. In FIG. 4, arrows 411 and 412 indicate that acoustic path estimate 401B is calculated based on acoustic path estimate 401A and clock skew estimate 402A, respectively. Thus, as shown in FIG. 4, a first acoustic path estimate of the plurality of acoustic path estimates (e.g., acoustic path estimate 401A) and a first clock skew estimate of the plurality of clock skew estimates (e.g., clock skew estimate 402A) may be used to calculate a second acoustic path estimate of the plurality of acoustic path estimates (e.g., acoustic path estimate 401B).

Additionally, each clock skew estimate of the plurality of clock skew estimates may be calculated based at least in part on two preceding acoustic path estimates, such as based on differences between the two preceding acoustic path estimates. For example, as shown in FIG. 4, clock skew estimate 402B may be calculated based on the two immediately preceding acoustic path estimates, which are acoustic path estimates 401A and 401B. In FIG. 4, arrows 421 and 422 indicate that clock skew estimate 402B is calculated based on acoustic path estimate 401A and acoustic path estimate 401B, respectively.

As described above, the plurality of acoustic path estimates may be calculated using a Kalman filtering technique. Some example Kalman filtering techniques are described above with reference to FIG. 12 and these techniques are not repeated here. These techniques may be based, at least in part on mathematical techniques described above with reference to FIGS. 8-11, which are also not repeated here. The Kalman filtering technique may employ an auxiliary constraint that corresponds to a super-Gaussian distribution. As shown in FIG. 4, in order to make the state-space model 103 (e.g., Kalman filtering technique) robust to non-Gaussian disturbances, an optimization criterion of the state-space model 103 may be augmented with a super-Gaussian auxiliary constraint 450) that corresponds to a super-Gaussian distribution. An example of the super-Gaussian auxiliary constraint 450) is shown in mathematical representation 1102A of FIG. 11. The plurality of clock skew estimates may also be calculated using a Kalman filtering technique. Some example techniques for calculating the clock skew estimates using Kalman filtering technique are described above with reference to clock skew estimation technique 1300 of FIG. 13 and are not repeated here.

In some examples, the plurality of acoustic path estimates and the plurality of clock skew estimates may be calculated by converting far-end audio samples and the near-end audio samples into the sub-band domain and then comparing the sub-band domain representations of the near-end audio samples and the far-end audio samples. As described above, the far-end audio samples and the near-end audio samples may be converted from a time domain into a sub-band domain using a MH-CMDCT 101 with a configurable hop size. For example, as shown in FIG. 2, MH-CMDCT 101 may be used to transform far-end tight analysis windows 211 into far-end sub-band representations 221. Additionally, MH-CMDCT 101 may be used to transform near-end tight analysis windows 212 into near-end sub-band representations 222. As also described above, sub-domain representations of the far-end audio samples and the near-end audio samples may be converted from the sub-band domain to the time domain using an IMH-CMDCT 102 with the configurable hop size. For example, as shown in FIG. 3, IMH-CMDCT 102 may be used to transform far-end tight synthesis windows 311 into far-end time domain representations 321. Additionally, IMH-CMDCT 102 may be used to transform near-end tight synthesis windows 312 into near-end time domain representations 322. As also described above, a window tightening procedure 203 may be performed to generate tightened windows corresponding to the far-end audio samples and the near-end audio samples for conversion into the sub-band domain and back into the time domain. The tightened windows may include far-end tight analysis windows 211 and near-end tight analysis windows 212 of FIG. 2 and far-end tight synthesis windows 311 and near-end tight synthesis windows 312 of FIG. 3.

At operation 1416, a first portion of the far-end audio may be filtered with the second acoustic path estimate to generate a replica of echo in the first portion of the far-end audio. For example, once the acoustic path estimate for a given time is calculated, the portion of the far-end audio corresponding to that time may be filtered with the calculated acoustic path estimate to generate a replica of the echo (e.g., echo replica 151 of FIG. 1) at the given time. Operation 1416 may include filtering each sub-band of the far-end audio for the given time with a corresponding acoustic path estimate for the sub-band. As an example, line 1205 of FIG. 12 shows that the far-end audio (e.g., microphone signal (x)) may be filtered with the corresponding acoustic path estimate (h). At operation 1418, the replica of the echo is removed from a second portion of the near-end audio that corresponds to the first portion of the far-end audio to form an AEC output. For example, as described above, at echo removal 152 of FIG. 1, the echo replica 151 may be removed from the near-end audio 112 to form AEC output 160. As described above, the clock skew may cause a delay associated with the acoustic path to appear to gradually increase or decrease over time. If a loudspeaker is being sampled more frequently than a microphone, then a delay associated with the acoustic path may appear to gradually decrease over time. Accordingly, in some examples, when the loudspeaker is being sampled more frequently than the microphone, the loudspeaker signal may be filtered based on the acoustic path to generate a replica of the echo, and the delay associated with the acoustic path may be increased by the amount of the previous estimated clock skew in order to determine a location at which to remove the replica of the echo from the microphone signal. By contrast, if the microphone is being sampled more frequently than the loudspeaker, then a delay associated with the acoustic path may appear to gradually increase over time. Accordingly, in some examples, when the microphone is being sampled more frequently than the loudspeaker, the loudspeaker signal may be filtered based on the acoustic path to generate a replica of the echo, and the delay associated with the acoustic path may be decreased by the amount of the previous estimated clock skew in order to determine a location at which to remove the replica of the echo from the microphone signal. Operation 1418 may include removing the corresponding sub-band echo replica for each sub-band of the second portion of the near-end audio. As an example, line 1205 of FIG. 12 shows that the echo replica (e.g., microphone signal (x) filtered with the corresponding acoustic path estimate (h)) may be subtracted from the near-end audio (e.g., loudspeaker signal (d)). After the replica of the echo is removed from a second portion of the near-end audio, the resulting AEC output may be transmitted to the far-end location. For example, after formation of the AEC output 160 (e.g., by removing the echo replica 151 from the near-end audio 112), the AEC output 160 may be sent to far-end location 171.

Figure 15:
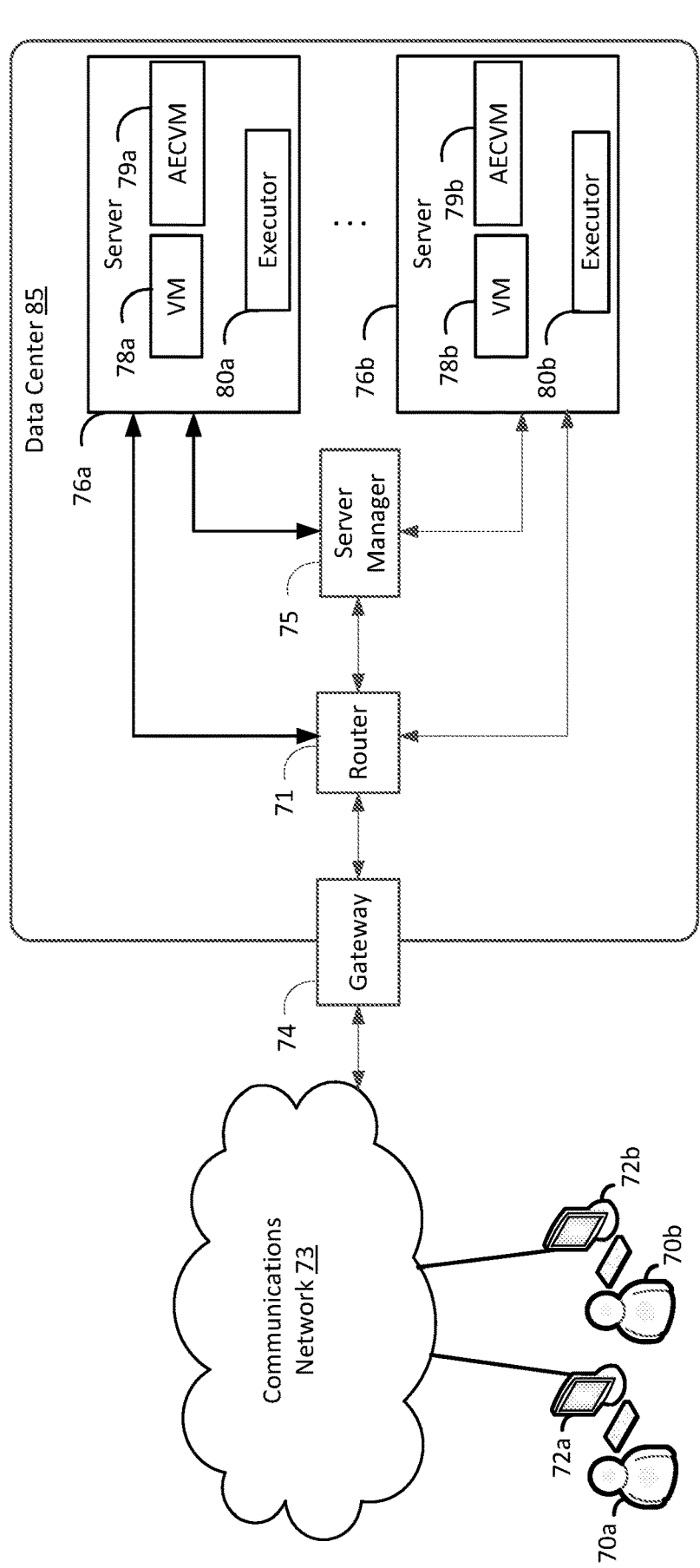
FIG. 15 is a diagram illustrating an example system for transmitting and providing data that may be used in accordance with the present disclosure.

An example system for transmitting and providing data will now be described in detail. In particular, FIG. 15 illustrates an example computing environment in which the embodiments described herein may be implemented. FIG. 15 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include acoustic echo cancellation virtual machines (VECVM's) 79a-b, which are virtual machines that are configured to execute any, or all, of the clock skew robust acoustic echo cancellation techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 15 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 15, a router 71 may be utilized to interconnect the servers 76a and 76b.

Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 15, a server manager 75 is also employed to at least in part direct various communications to, from and/or between servers 76a and 76b. While FIG. 15 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that data center 85 described in FIG. 15 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 16:
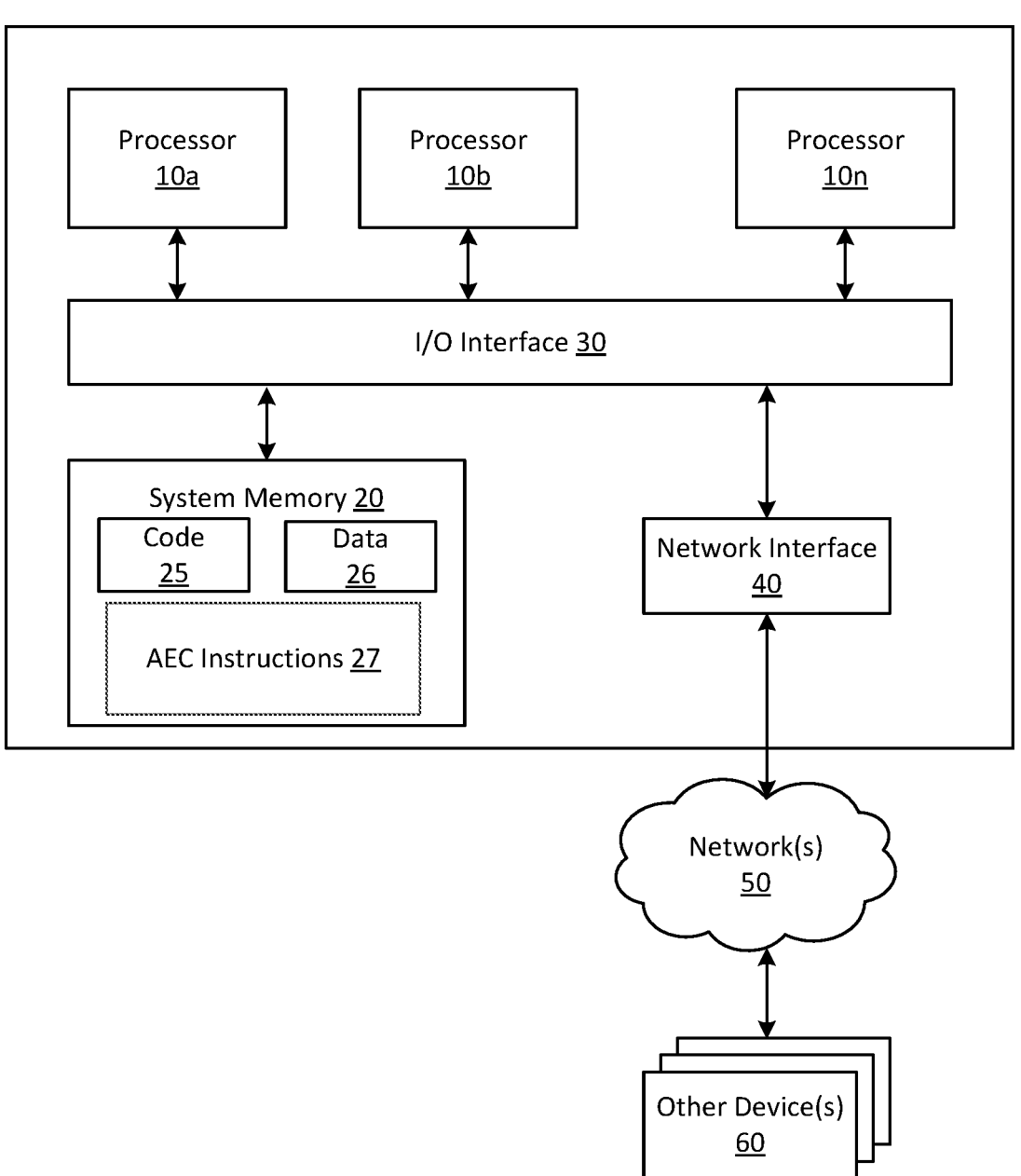
FIG. 16 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 16 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes acoustic echo cancellation (AEC) instructions 27, which are instructions for executing any, or all, of the clock skew robust acoustic echo cancellation techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations: in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:

one or more processors; and one or more memories having stored therein instructions that, upon execution by the one or more processors, cause the computing system to perform computing operations comprising:

receiving far-end audio samples corresponding to far-end audio that is output from one or more audio output components at a near-end location, wherein the far-end audio is captured at a far-end location and transmitted to the near-end location;

receiving near-end audio samples corresponding to near-end audio that is captured by one or more audio input components at the near-end location;

calculating, using a state-space model, based at least in part on the far-end audio samples and the near-end audio samples, a plurality of acoustic path estimates and a plurality of clock skew estimates, wherein the plurality of acoustic path estimates approximate an acoustic path between the one or more audio output components and the one or more audio input components, and wherein the plurality of clock skew estimates approximate a clock skew caused by a difference between a far-end sampling rate associated with the one or more audio output components and a near-end sampling rate associated with the one or more audio input components, wherein the plurality of acoustic path estimates and the plurality of clock skew estimates are calculated in an alternating order, and wherein a first acoustic path estimate of the plurality of acoustic path estimates and a first clock skew estimate of the plurality of clock skew estimates are used to calculate a second acoustic path estimate of the plurality of acoustic path estimates;

filtering a first portion of the far-end audio with the second acoustic path estimate to generate a replica of echo in the first portion of the far-end audio; and removing the replica of the echo from a second portion of the near-end audio that corresponds to the first portion of the far-end audio.

2. The computing system of claim 1, wherein the plurality of acoustic path estimates are calculated using a Kalman filtering technique.

3. The computing system of claim 1, wherein the operations further comprise converting the far-end audio samples and the near-end audio samples from a time domain into a sub-band domain using a multi-hop complex modified discrete cosine transform (MH-CMDCT) with a configurable hop size.

4. The computing system of claim 3, wherein the operations further comprise converting sub-domain representations of the far-end audio samples and the near-end audio samples from the sub-band domain to the time domain using an inverse multi-hop complex modified discrete cosine transform (IMH-CMDCT) with the configurable hop size.

5. A computer-implemented method comprising:

receiving far-end audio samples corresponding to far-end audio that is output from one or more audio output components at a near-end location, wherein the far-end audio is captured at a far-end location and transmitted to the near-end location;

receiving near-end audio samples corresponding to near-end audio that is captured by one or more audio input components at the near-end location;

calculating, using a state-space model, based at least in part on the far-end audio samples and the near-end audio samples, a plurality of acoustic path estimates and a plurality of clock skew estimates, wherein the plurality of acoustic path estimates and the plurality of clock skew estimates are calculated in an alternating order, and wherein a first acoustic path estimate of the plurality of acoustic path estimates and a first clock skew estimate of the plurality of clock skew estimates are used to calculate a second acoustic path estimate of the plurality of acoustic path estimates;

filtering a first portion of the far-end audio with the second acoustic path estimate to generate a replica of echo in the first portion of the far-end audio; and removing the replica of the echo from a second portion of the near-end audio that corresponds to the first portion of the far-end audio.

6. The computer-implemented method of claim 5, wherein the plurality of acoustic path estimates approximate an acoustic path between the one or more audio output components and the one or more audio input components, and wherein the plurality of clock skew estimates approximate a clock skew caused by a difference between a far-end sampling rate associated with the one or more audio output components and a near-end sampling rate associated with the one or more audio input components.

7. The computer-implemented method of claim 5, wherein the plurality of acoustic path estimates are calculated using a Kalman filtering technique.

8. The computer-implemented method of claim 7, wherein the Kalman filtering technique employs an auxiliary constraint that corresponds to a super-Gaussian distribution.

9. The computer-implemented method of claim 5, wherein each acoustic path estimate of the plurality of acoustic path estimates is calculated based at least in part on a preceding acoustic path estimate and a preceding clock skew estimate.

10. The computer-implemented method of claim 5, wherein each clock skew estimate of the plurality of clock skew estimates is calculated based at least in part on two preceding acoustic path estimates.

11. The computer-implemented method of claim 5, further comprising converting the far-end audio samples and the near-end audio samples from a time domain into a sub-band domain using a multi-hop complex modified discrete cosine transform (MH-CMDCT) with a configurable hop size.

12. The computer-implemented method of claim 11, further comprising converting sub-domain representations of the far-end audio samples and the near-end audio samples from the sub-band domain to the time domain using an inverse multi-hop complex modified discrete cosine transform (IMH-CMDCT) with the configurable hop size.

13. The computer-implemented method of claim 12, further comprising performing a window tightening procedure to generate tightened windows corresponding to the far-end audio samples and the near-end audio samples for conversion into the sub-band domain and back into the time domain.

14. The computer-implemented method of claim 12, wherein different quantities of taps for different sub-bands are used for the calculating of the plurality of acoustic path estimates and the plurality of clock skew estimates.

15. One or more non-transitory computer-readable storage media having stored thereon computing instructions that, upon execution by one or more computing devices, cause the one or more computing devices to perform computing operations comprising:

receiving far-end audio samples corresponding to far-end audio that is output from one or more audio output components at a near-end location, wherein the far-end audio is captured at a far-end location and transmitted to the near-end location;

receiving near-end audio samples corresponding to near-end audio that is captured by one or more audio input components at the near-end location;

calculating, using a state-space model, based at least in part on the far-end audio samples and the near-end audio samples, a plurality of acoustic path estimates and a plurality of clock skew estimates, wherein the plurality of acoustic path estimates and the plurality of clock skew estimates are calculated in an alternating order, and wherein a first acoustic path estimate of the plurality of acoustic path estimates and a first clock skew estimate of the plurality of clock skew estimates are used to calculate a second acoustic path estimate of the plurality of acoustic path estimates;

filtering a first portion of the far-end audio with the second acoustic path estimate to generate a replica of echo in the first portion of the far-end audio; and removing the replica of the echo from a second portion of the near-end audio that corresponds to the first portion of the far-end audio.

16. The one or more non-transitory computer-readable storage media of claim 15, wherein the plurality of acoustic path estimates are calculated using a Kalman filtering technique.

17. The one or more non-transitory computer-readable storage media of claim 15, wherein each acoustic path estimate of the plurality of acoustic path estimates is calculated based at least in part on a preceding acoustic path estimate and a preceding clock skew estimate.

18. The one or more non-transitory computer-readable storage media of claim 15, wherein each clock skew estimate of the plurality of clock skew estimates is calculated based at least in part on two preceding acoustic path estimates.

19. The one or more non-transitory computer-readable storage media of claim 15, wherein the operations further comprise converting the far-end audio samples and the near-end audio samples from a time domain into a sub-band domain using a multi-hop complex modified discrete cosine transform (MH-CMDCT) with a configurable hop size.

20. The one or more non-transitory computer-readable storage media of claim 19, wherein the operations further comprise converting sub-domain representations of the far-end audio samples and the near-end audio samples from the sub-band domain to the time domain using an inverse multi-hop complex modified discrete cosine transform (IMH-CMDCT) with the configurable hop size.

* * * * *